US010695665B2

(12) United States Patent
Miyaki

(10) Patent No.: US 10,695,665 B2
(45) Date of Patent: Jun. 30, 2020

(54) ASYNCHRONOUS VIRTUAL REALITY INTERACTIONS

(71) Applicant: Sony Interactive Entertainment America LLC, San Mateo, CA (US)

(72) Inventor: Ken Miyaki, San Mateo, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 158 days.

(21) Appl. No.: 15/924,082

(22) Filed: Mar. 16, 2018

(65) Prior Publication Data
US 2019/0282892 A1   Sep. 19, 2019

(51) Int. Cl.
| | |
|---|---|
| *A63F 13/25* | (2014.01) |
| *A63F 13/52* | (2014.01) |
| *A63F 13/86* | (2014.01) |
| *A63F 13/212* | (2014.01) |
| *A63F 13/497* | (2014.01) |
| *A63F 13/5255* | (2014.01) |
| *A63F 13/211* | (2014.01) |

(52) U.S. Cl.
CPC ............ *A63F 13/25* (2014.09); *A63F 13/211* (2014.09); *A63F 13/212* (2014.09); *A63F 13/497* (2014.09); *A63F 13/52* (2014.09); *A63F 13/5255* (2014.09); *A63F 13/86* (2014.09); *A63F 2300/8082* (2013.01)

(58) Field of Classification Search
CPC . A63F 13/25; A63F 13/211; A63F 2300/8082
See application file for complete search history.

(56) References Cited

U.S. PATENT DOCUMENTS

| | | | |
|---|---|---|---|
| 9,919,218 B1* | 3/2018 | Wakeford | ............... A63F 13/77 |
| 2014/0375680 A1* | 12/2014 | Ackerman | ........... G06T 19/006 |
| | | | 345/633 |
| 2016/0260246 A1* | 9/2016 | Oldcorn | ................. G06T 15/80 |

(Continued)

FOREIGN PATENT DOCUMENTS

WO    WO2017161276 A1    9/2017

OTHER PUBLICATIONS

Ribarov, Javor _ PCT/US2019/015709 _ Notification of Transmittal of the International Search Report and the Written Opinion of the International Searching Authority, or the Declaration _ dated Apr. 8, 2019 _ 12 pages.

*Primary Examiner* — Chase E Leichliter
(74) *Attorney, Agent, or Firm* — Penilla IP, APC

(57) ABSTRACT

A method is provided, including: recording gameplay metadata generated from execution of a first session of a video game, the execution of the first session being driven by interactive gameplay of the video game by a first user using a first head-mounted display (HMD), wherein the execution of the first session renders a first view of a virtual environment from a first location determined by the interactive gameplay, and based on tracked movement of the first HMD; transmitting the gameplay metadata to a client device; tracking movement of a second HMD; executing, by the client device, a second session of the video game using the gameplay metadata to recreate gameplay events, wherein the execution of the second session renders a second view of the virtual environment from a second location that is determined based on the first location, and based on the tracked movement of the second HMD.

17 Claims, 14 Drawing Sheets

(56) References Cited

U.S. PATENT DOCUMENTS

| | | | |
|---|---|---|---|
| 2017/0237789 A1* | 8/2017 | Harner | G06F 3/017 |
| | | | 709/205 |
| 2017/0354875 A1* | 12/2017 | Marks | A63F 13/213 |
| 2017/0358137 A1* | 12/2017 | Auten | H04L 67/12 |
| 2018/0021684 A1* | 1/2018 | Benedetto | H04N 21/274 |
| | | | 463/24 |
| 2018/0103072 A1* | 4/2018 | Liu | H04L 67/303 |
| 2018/0126268 A1* | 5/2018 | Santos | A63F 13/428 |

* cited by examiner

ASYNCHRONOUS VIRTUAL REALITY INTERACTIONS

BACKGROUND

1. Field of the Disclosure

The present disclosure relates to providing asynchronous virtual reality interactions, and associated apparatus and methods.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce very detailed and engaging gaming experiences.

Example gaming platforms include the Sony Playstation®, Sony Playstation2® (PS2), Sony Playstation3® (PS3), and Sony Playstation4® (PS4), each of which is sold in the form of a game console. As is well known, the game console is designed to connect to a display (typically a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console may be further designed with an optical disc reader for receiving game discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head-mounted display (HMD). A HMD is worn by the user and can be configured to present various graphics, such as a view of a virtual space/environment. The graphics presented on a head-mounted display can cover a large portion or even all of a user's field of view. Hence, a HMD can provide a visually immersive experience to the user. Use of a HMD in this manner to experience a virtual environment is generally referred to as virtual reality (VR), and hence a HMD is also known as a VR headset.

Another growing trend in the industry involves the development of cloud-based gaming systems. Such systems may include a remote processing server that executes a game application, and communicates with a local thin client that can be configured to receive input from users and render video on a display. In some implementations, the remote processing server can include the physical hardware of a gaming console, or such hardware that replicates that of a gaming console. In other implementations, the remote processing server may define a virtual machine that emulates the hardware of a gaming console.

It is in this context that embodiments of the disclosure arise.

SUMMARY

Implementations of the present disclosure include methods and systems that are used for providing asynchronous virtual reality interactions.

In some implementations, a method is provided, including the following operations: recording gameplay metadata generated from execution of a first session of a video game, the execution of the first session being driven by interactive gameplay of the video game by a first user using a first head-mounted display (HMD), wherein the execution of the first session renders a first view of a virtual environment of the video game for presentation through the first HMD, the first view being from a first location in the virtual environment determined by the interactive gameplay, the first view further being based on tracked movement of the first HMD; after completion of the first session, transmitting the gameplay metadata to a client device; tracking movement of a second HMD by the client device; executing, by the client device, a second session of the video game using the gameplay metadata to recreate gameplay events from the first session in the second session, wherein the execution of the second session renders a second view of the virtual environment for presentation through a second HMD, the second view being from a second location in the virtual environment that is determined based on the first location in the virtual environment, the second view further being based on the tracked movement of the second HMD.

In some implementations, the tracked movement of the first HMD includes a tracked orientation of the first HMD in a first local environment in which the first HMD is disposed; wherein an orientation of the first view in the virtual environment is determined by the tracked orientation of the first HMD.

In some implementations, the tracked movement of the second HMD includes a tracked orientation of the second HMD in a second local environment in which the second HMD is disposed; wherein an orientation of the second view in the virtual environment is determined by the tracked orientation of the second HMD.

In some implementations, the first location in the virtual environment is a predefined first position in a virtual vehicle that is disposed in the virtual environment; wherein the second location in the virtual environment is a predefined second position in the virtual vehicle.

In some implementations, the predefined first position in the virtual vehicle is a driver position in the virtual vehicle; wherein the predefined second position in the virtual vehicle is a passenger position in the virtual vehicle.

In some implementations, the gameplay metadata includes game state values generated by the execution of the first session of the video game.

In some implementations, the execution of the first session includes processing input data generated from the interactive gameplay by the first user; wherein the gameplay metadata includes the input data.

In some implementations, the input data is generated via an input device operated by the first user.

In some implementations, the first session is executed by a computing device that is remote to the client device, the computing device and the client device being connected to a network, the gameplay metadata being transmitted over the network.

In some implementations, a method is provided, including the following operations: recording gameplay metadata generated from execution of a first session of a video game, the execution of the first session being driven by interactive gameplay of the video game by a first user using a first head-mounted display (HMD), wherein the execution of the first session renders a first view of a virtual environment of the video game for presentation through the first HMD, the first view being from a first location in the virtual environment determined by the interactive gameplay, the first view further being based on tracked movement of the first HMD; after completion of the first session, transmitting the gameplay metadata to a client device; tracking movement of a second HMD by the client device; executing, by the client device, a second session of the video game using the gameplay metadata to recreate gameplay events from the first session in the second session, wherein the execution of the second session renders a second view of the virtual environment for presentation through a second HMD, the second view being from a second location in the virtual environment that is determined based on the tracked movement of the second HMD.

In some implementations, the second location is further determined using input data generated from interactivity with the second session of the video game by a second user.

In some implementations, the input data is generated via an input device operated by the second user.

In some implementations, the tracked movement of the second HMD includes a tracked orientation of the second HMD in a local environment in which the second HMD is disposed; wherein an orientation of the second view in the virtual environment is determined by the tracked orientation of the second HMD.

In some implementations, the rendering of the second view is configured to have a setting that is adjusted based on the orientation of the second view relative to the first location of the first view in the virtual environment.

In some implementations, the adjustment of the setting includes adjustment of a level of detail of the rendering of the second view, such that the level of detail is increased when the orientation of the second view is towards the first location of the first view, and the level of detail is decreased when the orientation of the second view is away from the first location of the first view.

In some implementations, the level detail is defined by one or more of an amount of virtual objects, an amount of color saturation, an amount of texture, an amount of shading, a level of resolution, a complexity of graphics.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which.

DETAILED DESCRIPTION

The following implementations of the present disclosure provide methods and systems for providing asynchronous virtual reality (VR) interactions. At present, the virtual reality market is expanding, but not very large by comparison to the broader video gaming market. Therefore, it may be difficult to find other virtual reality users online for synchronous interactions. Accordingly, it is useful to provide asynchronous interactions that leverage the network of virtual reality users.

It will be obvious, however, to one skilled in the art, that the present disclosure may be practiced without some or all of these specific details. In other instances, well known process operations have not been described in detail in order not to unnecessarily obscure the present disclosure.

Figure 1:
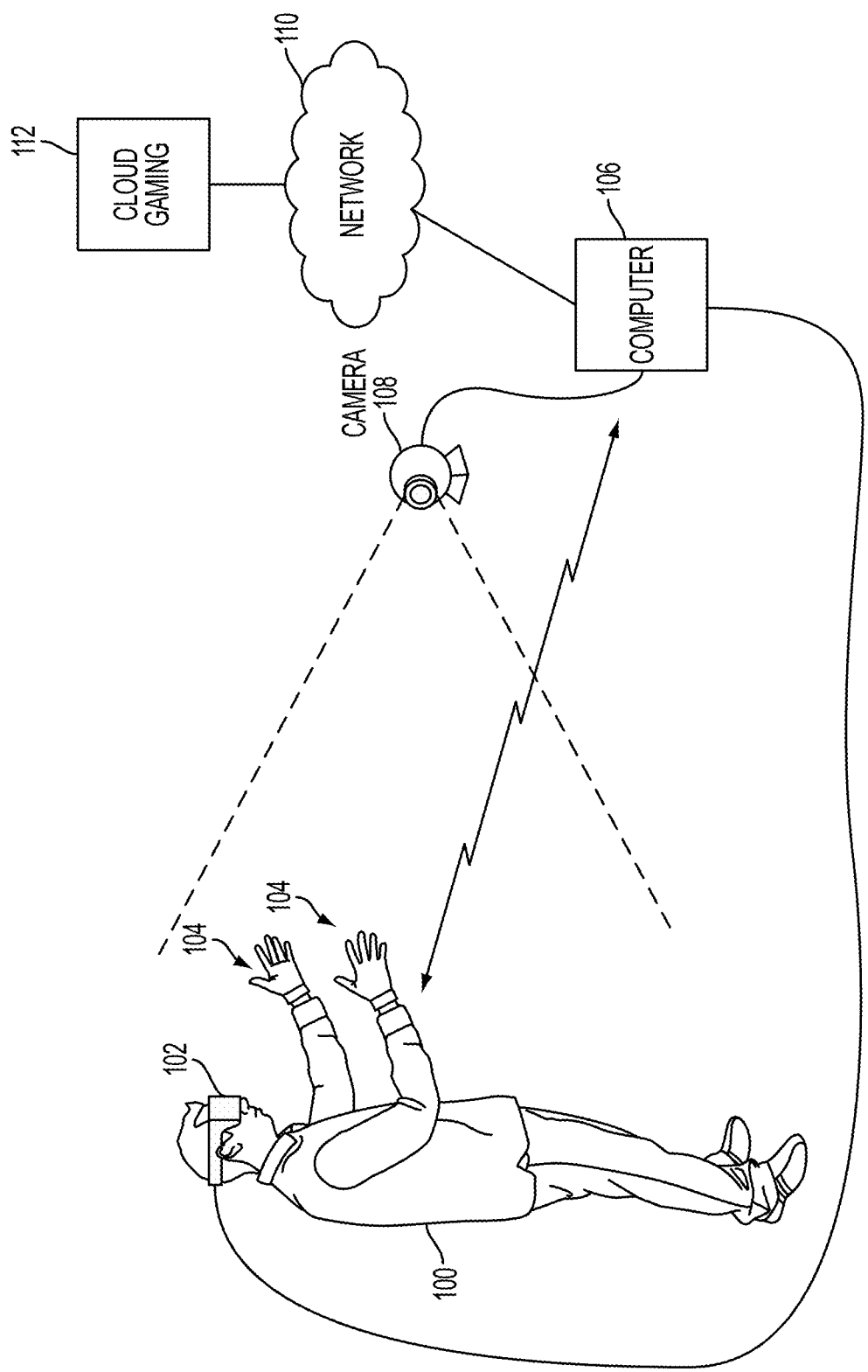
FIG. 1 illustrates a system for interactive gameplay of a video game, in accordance with an embodiment of the disclosure.

FIG. 1 illustrates a system for interactive gameplay of a video game, in accordance with an embodiment of the disclosure. A user 100 is shown wearing a head-mounted display (HMD) 102, also known as a virtual reality (VR) headset. The HMD 102 is worn in a manner similar to glasses, goggles, or a helmet, and is configured to display a video game or other content to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user. The term "virtual reality" generally refers to viewing of a virtual space/environment through an HMD, such that the view of the virtual space shown by the HMD to the user is responsive in real-time to the tracked movements of the HMD, thereby providing the sensation to the user of being physically present in the virtual space/environment. For example, when the user moves their head in a given direction, then the view shown through the HMD is updated to show the view in that direction in the virtual space.

In one embodiment, the HMD 102 can be connected to a computer 106. The connection to computer 106 can be wired or wireless. The computer 106 can be any general or special purpose computer known in the art, including but not limited to, a gaming console, personal computer, laptop, tablet computer, mobile device, cellular phone, tablet, thin client, set-top box, media streaming device, etc. In one embodiment, the computer 106 can be configured to execute a video game, and output the video and audio from the video game for rendering by the HMD 102.

The user 100 may operate an interface object 104 (e.g. controller device, glove controller, etc.) to provide input for the video game. Additionally, a camera 108 can be configured to capture images of the interactive environment in which the user 100 is located. These captured images can be analyzed to determine the location and movements of the user 100, the HMD 102, and the interface object 104. In one embodiment, the interface object 104 includes a light which can be tracked to determine its location and orientation. Additionally, the HMD 102 may include one or more lights which can be tracked to determine the location and orientation of the HMD 102. The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In another embodiment, the computer 106 functions as a thin client in communication over a network with a cloud gaming provider 112. The cloud gaming provider 112 maintains and executes the video game being played by the user 102. The computer 106 transmits inputs from the HMD 102, the interface object 104 and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a vibration feedback command is provided to the interface object 104.

In one embodiment, the HMD 102, interface object 104, and camera 108, may themselves be networked devices that connect to the network 110 to communicate with the cloud gaming provider 112. For example, the computer 106 may be a local network device, such as a router, that does not otherwise perform video game processing, but which facilitates passage of network traffic. The connections to the network by the HMD 102, interface object 104, and camera 108 may be wired or wireless.

Additionally, though embodiments in the present disclosure may be described with reference to a head-mounted display, it will be appreciated that in other embodiments, non-head mounted displays may be substituted, including without limitation, a television, projector, LCD display screen, portable device screen (e.g. tablet, smartphone, laptop, etc.) or any other type of display that can be configured to render video and/or provide for display of an interactive scene or virtual environment in accordance with the present embodiments.

Figure 2:
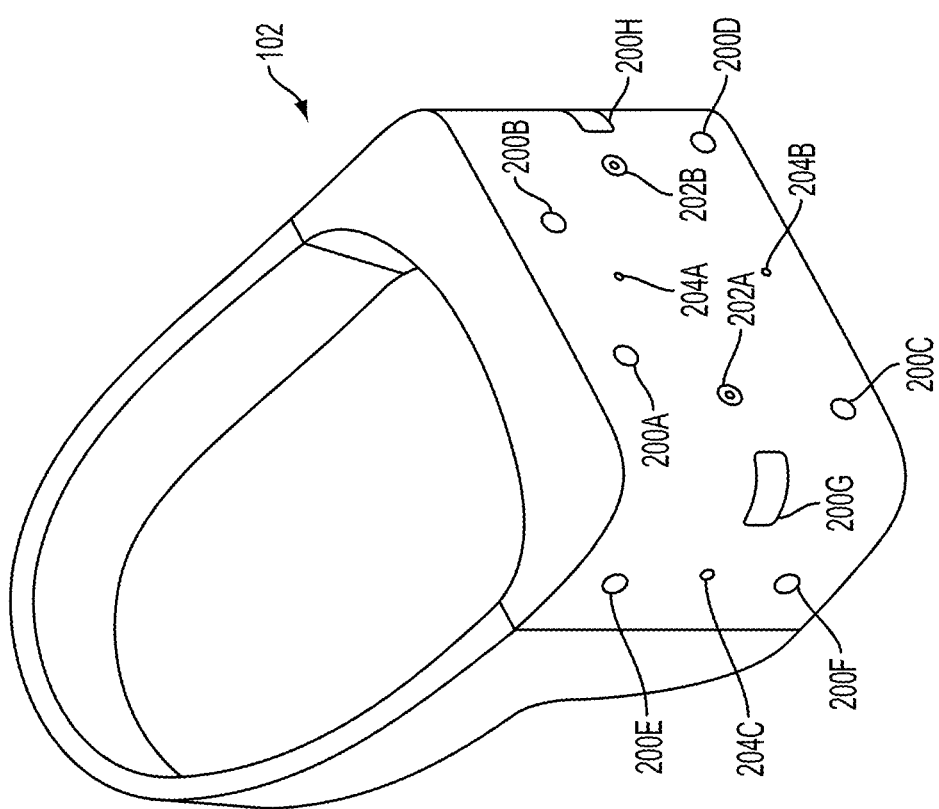
FIG. 2 illustrates a head-mounted display (HMD), in accordance with an embodiment of the disclosure.

FIG. 2 illustrates a head-mounted display (HMD), in accordance with an embodiment of the disclosure. As shown, the HMD 102 includes a plurality of lights 200A-H. Each of these lights may be configured to have specific shapes, and can be configured to have the same or different colors. The lights 200A, 200B, 200C, and 200D are arranged on the front surface of the HMD 102. The lights 200E and 200F are arranged on a side surface of the HMD 102. And the lights 200G and 200H are arranged at corners of the HMD 102, so as to span the front surface and a side surface of the HMD 102. It will be appreciated that the lights can be identified in captured images of an interactive environment in which a user uses the HMD 102. Based on identification and tracking of the lights, the location and orientation of the HMD 102 in the interactive environment can be determined. It will further be appreciated that some of the lights may or may not be visible depending upon the particular orientation of the HMD 102 relative to an image capture device. Also, different portions of lights (e.g. lights 200G and 200H) may be exposed for image capture depending upon the orientation of the HMD 102 relative to the image capture device.

In one embodiment, the lights can be configured to indicate a current status of the HMD to others in the vicinity. For example, some or all of the lights may be configured to have a certain color arrangement, intensity arrangement, be configured to blink, have a certain on/off configuration, or other arrangement indicating a current status of the HMD 102. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases. In this manner, a person external to the user may view the lights on the HMD 102 and understand that the user is actively engaged in intense gameplay, and may not wish to be disturbed at that moment.

The HMD 102 may additionally include one or more microphones. In the illustrated embodiment, the HMD 102 includes microphones 204A and 204B defined on the front surface of the HMD 102, and microphone 204C defined on a side surface of the HMD 102. By utilizing an array of microphones, sound from each of the microphones can be processed to determine the location of the sound's source.

This information can be utilized in various ways, including exclusion of unwanted sound sources, association of a sound source with a visual identification, etc.

The HMD 102 may also include one or more image capture devices. In the illustrated embodiment, the HMD 102 is shown to include image capture devices 202A and 202B. By utilizing a stereoscopic pair of image capture devices, three-dimensional (3D) images and video of the environment can be captured from the perspective of the HMD 102. Such video can be presented to the user to provide the user with a "video see-through" ability while wearing the HMD 102. That is, though the user cannot see through the HMD 102 in a strict sense, the video captured by the image capture devices 202A and 202B can nonetheless provide a functional equivalent of being able to see the environment external to the HMD 102 as if looking through the HMD 102. Such video can be augmented with virtual elements to provide an augmented reality experience, or may be combined or blended with virtual elements in other ways. Though in the illustrated embodiment, two cameras are shown on the front surface of the HMD 102, it will be appreciated that there may be any number of externally facing cameras installed on the HMD 102, oriented in any direction. For example, in another embodiment, there may be cameras mounted on the sides of the HMD 102 to provide additional panoramic image capture of the environment.

In some implementations, externally facing cameras are used to enable tracking of the location and/or orientation of the HMD. In some implementations, the HMD uses a simultaneous localization and mapping (SLAM) technique or other method for determining location/orientation of the HMD in a local environment.

In some implementations, the HMD includes one or more inertial sensors to enable detection and tracking of movements of the HMD.

In some implementations, the HMD includes magnetic sensors configured to detect magnetic fields/signals generated by one or more magnetic emitters positioned in the local environment. By sensing the magnetic fields/signals, the location and/or orientation of the HMD can be determined.

Figure 3:
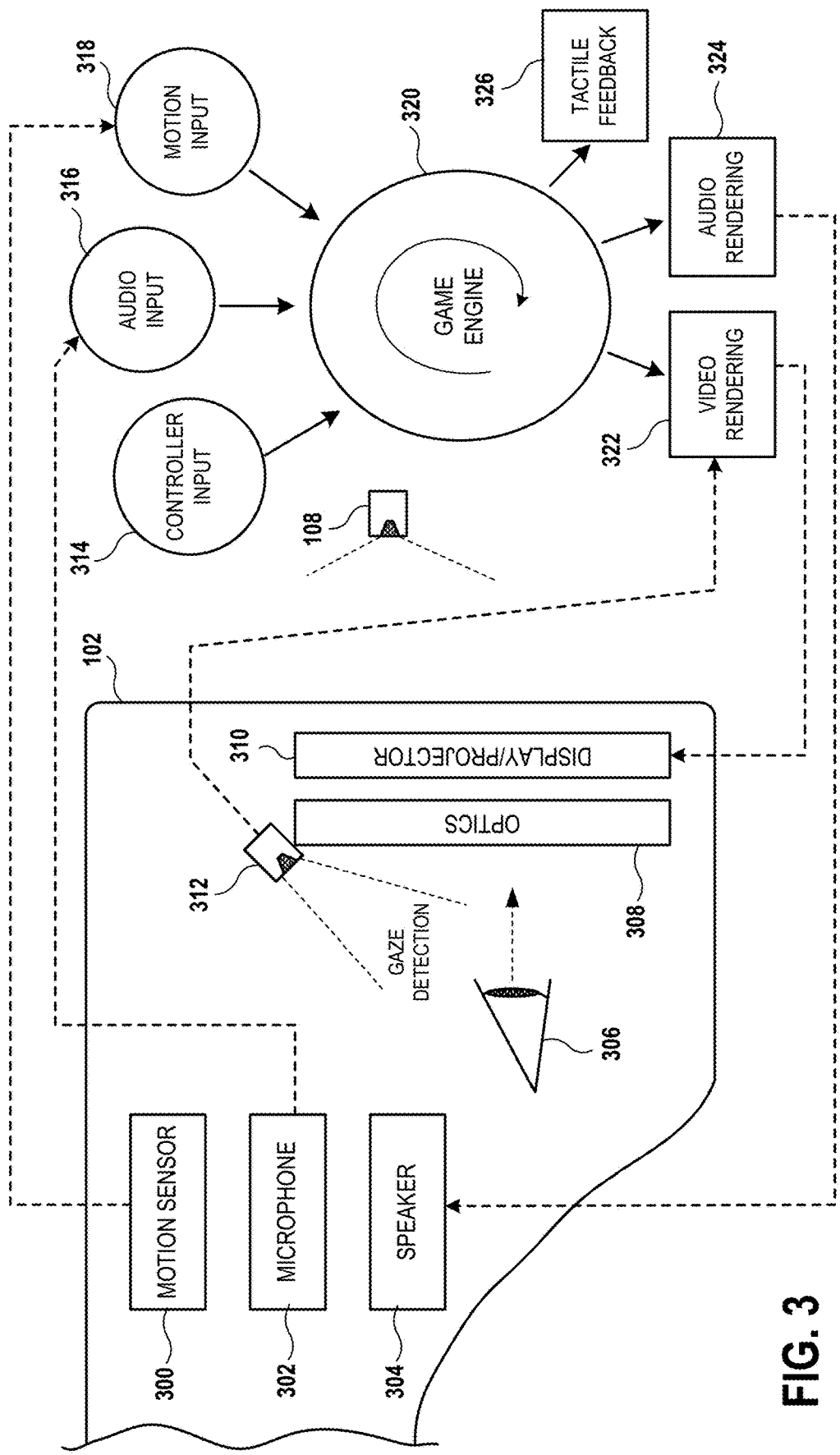
FIG. 3 conceptually illustrates the function of a HMD in conjunction with an executing video game, in accordance with an embodiment of the disclosure.

FIG. 3 conceptually illustrates the function of the HMD 102 in conjunction with an executing video game, in accordance with an embodiment of the disclosure. The executing video game is defined by a game engine 320 which receives inputs to update a game state of the video game. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated embodiment, the game engine receives, by way of example, controller input 314, audio input 316 and motion input 318. The controller input 314 may be defined from the operation of a gaming controller separate from the HMD 102, such as a handheld gaming controller (e.g. Sony DUALSHOCK®4 wireless controller, Sony Playstation®Move motion controller) or glove interface object 104. By way of example, controller input 314 may include directional inputs, button presses, trigger activation, movements, gestures, or other kinds of inputs processed from the operation of a gaming controller. The audio input 316 can be processed from a microphone 302 of the HMD 102, or from a microphone included in the image capture device 108 or elsewhere in the local environment. The motion input 318 can be processed from a motion sensor 300 included in the HMD 102, or from image capture device 108 as it captures images of the HMD 102. The game engine 320 receives inputs which are processed according to the configuration of the game engine to update the game state of the video game. The game engine 320 outputs game state data to various rendering modules which process the game state data to define content which will be presented to the user.

In the illustrated embodiment, a video rendering module 322 is defined to render a video stream for presentation on the HMD 102. The video stream may be presented by a display/projector mechanism 310, and viewed through optics 308 by the eye 306 of the user. An audio rendering module 304 is configured to render an audio stream for listening by the user. In one embodiment, the audio stream is output through a speaker 304 associated with the HMD 102. It should be appreciated that speaker 304 may take the form of an open air speaker, headphones, or any other kind of speaker capable of presenting audio.

In one embodiment, a gaze tracking camera 312 is included in the HMD 102 to enable tracking of the gaze of the user. The gaze tracking camera captures images of the user's eyes, which are analyzed to determine the gaze direction of the user. In one embodiment, information about the gaze direction of the user can be utilized to affect the video rendering. For example, if a user's eyes are determined to be looking in a specific direction, then the video rendering for that direction can be prioritized or emphasized, such as by providing greater detail or faster updates in the region where the user is looking. It should be appreciated that the gaze direction of the user can be defined relative to the head mounted display, relative to a real environment in which the user is situated, and/or relative to a virtual environment that is being rendered on the head mounted display.

Broadly speaking, analysis of images captured by the gaze tracking camera 312, when considered alone, provides for a gaze direction of the user relative to the HMD 102. However, when considered in combination with the tracked location and orientation of the HMD 102, a real-world gaze direction of the user can be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 326 is configured to provide signals to tactile feedback hardware included in either the HMD 102 or another device operated by the user, such as a controller 104. The tactile feedback may take the form of various kinds of tactile sensations, such as vibration feedback, temperature feedback, pressure feedback, etc.

Figure 4:
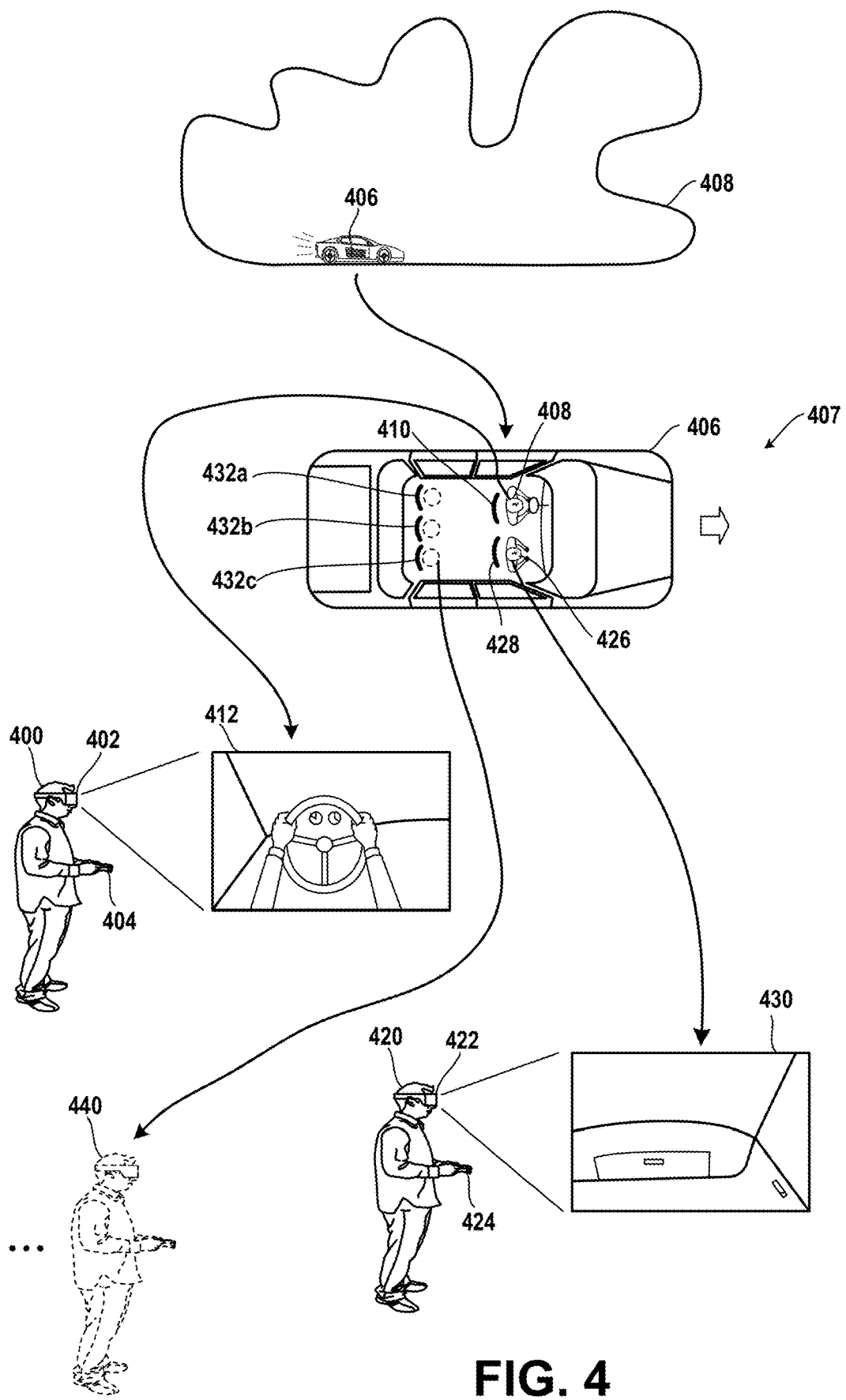
FIG. 4 conceptually illustrates an asynchronous interaction between users of head-mounted displays, in accordance with implementations of the disclosure.

FIG. 4 conceptually illustrates an asynchronous interaction between users of head-mounted displays, in accordance with implementations of the disclosure. In the illustrated implementation, a first user 400 plays a video game in which the first user 400 controls a vehicle. For example, the video game may be a racing game in which the first user 400 races a vehicle 406 (e.g. car, boat, plane, spacecraft, etc.) along a course 408. By way of example without limitation, in the illustrated implementation, the vehicle 406 is in the form of a car having a driver's seat and several passenger seats.

Shown at reference 407 is a conceptual overhead view of the vehicle 406. The first user 400 controls a virtual character 408 that drives the car 406. The virtual character 408 is seated in the driver's seat 410 of the car 406. Thus, the view 412 is from the perspective of the virtual character 408 in the driver's seat 410, which defines a first view location in the virtual environment of the video game. By way of example without limitation, when the first user 400 is looking ahead, then the first user 400 may see the hands of the virtual character 408 operating the steering wheel of the car 406.

It will be appreciated that the first user's view 412 during the course of gameplay can be recorded as video. This recorded video can be later played back and viewed by another user. However, when the later user is another HMD user, such playback fails to leverage the capabilities of the HMD to provide a more engaging experience. And furthermore, the forced movements of the view may induce discomfort or sickness for the later user. Thus, in accordance with implementations of the disclosure an enhanced asynchronous experience can be provided to HMD users that goes beyond playing back recorded video of the first user's 400 gameplay.

For example, in the illustrated implementation, a second user 420 is provided with the ability to view the first user 400 gameplay, but as a passenger in the car 406. The second user 420 views a replay of the first user's 400 gameplay using an HMD 422. The second user 420 may also operate a controller device 424 to provide input and provide commands during the viewing of the replay. As a passenger in the car 406, the second user 420 may be represented by and control a virtual character 426 that is situated in a passenger seat 428 in the car 406. As such, the view 430 of the virtual environment is defined from the perspective of a second view location in the car 406, which is that of the virtual character 426 in the passenger seat 428.

It should be appreciated that the view 430 provided to the second user 420 is a novel viewpoint that did not exist before and was not generated during the initial gameplay by the first user 400. Furthermore, the view 430 can be responsive to tracked movements of the HMD 422, so that the second user 420 is able to look around during the replay and see in different directions. In some implementations, the location and/or orientation of the HMD 422 is tracked and used to determine the view location and/or orientation of the view 430. It will be appreciated that as the view 430 is from the perspective of a passenger virtual character 426 in the car 406, the view location of the view 430 for the second user 420 is tied to the location and movement of the car 406 in the virtual environment of the video game. In some implementations, the view location of the view 430 is limited by the confines of the car 406. For example, there may be a limited space within the car 406 within which the view location of the view 430 may be moved, so that, for example, the view location cannot be moved to outside the car 406 in response to movements of the HMD 422 by the second user 420.

In some implementations, the second user 420 can provide comments during the replay. Furthermore, such comments can be linked to the specific playback times during the replay when the comments were made, so that other users viewing the replay (which may include the first user 400) may see the comments at the time they were made when viewing the replay.

By enabling the second user 420 to view the first user 400 gameplay from a different perspective (that of a passenger in the same vehicle) the second user 420 is able to experience a greater sense of participation and interaction in the gameplay, despite the interaction being asynchronous. For it is a natural perspective to be a passenger in a vehicle driven by another, whereas it is unnatural to occupy the perspective of a driver without actually being the driver of the vehicle.

In some implementations, there can be additional passenger seats in the car 406, such as passenger seats 432*a*, 432*b*, and 432*c*. Such passenger seats may be occupied by additional virtual characters that are representative of additional users 440. It will be appreciated that such additional users 440 will be able to view the replay from the perspective defined by their respective virtual characters in their seats in the car 406. In some implementations, when multiple users occupy the car 406 simultaneously, they can interact with each other, such as by talking and/or text chat. Each user is represented by their respective virtual character, or avatar, which can be customized by each user to their own liking. Users that are passengers together at the same time in the car 406 will thus be able to see each others' avatars and interact with one another as if they were passengers in a real vehicle. In this way, a shared experience can be provided that is asynchronous from the initial gameplay by the first user 400. Users may further control gestures of their corresponding virtual characters/avatars through various control mechanisms, such as by use of controller devices, user motion tracking, etc.

In some implementations, when the second user 420 (and/or other additional users as described above), views the gameplay of the first user 400 as a passenger in the car 406, the second user's 420 view can be recorded. Such a recorded ride-along video can be made available to other users for viewing in accordance with implementations of the disclosure.

In some implementations, when the second user 420 (and/or other additional users as described above), views the gameplay of the first user 400 as a passenger in the car 406, the interactions of the second user 420 during the viewing can be recorded. For example, the movements of the second user's 420 virtual character/avatar 426, spoken audio by the second user 420, comments by the second user 420, etc. can be recorded. Using this information along with the recorded gameplay of the first user 400, then yet another user may asynchronously view the gameplay of the first user 400 along with the interactions of the second user 420 during the second user's 420 viewing of the first user's 400 gameplay. In this manner, subsequent asynchronous interactions by the second user 420 can be made available similar to the way that the first user's gameplay appears to the second user, for example, for one or more additional passengers in seats 432*a*, 432*b*, and 432*c* (users 440). The additional passengers can thereby view the aggregate playback of the first user 400 and the second user 420.

By way of example without limitation, such a feature to enable viewing of aggregated asynchronous interactions could be useful for providing gaming tutorials wherein a player's gameplay is critiqued by another player. For example, as noted above, the first user 400 gameplay is recorded as they traverse the race track, with the metadata and game state recorded (e.g. vehicle position, first user 400 gestures, etc.). Then, the second user 420 uses the captured metadata as a passenger in the car at some later point, and critiques the first user's 400 driving, (e.g. indicating that the first user 400 is missing the apex, or not swinging out wide enough at the exit of a turn leading to a high speed straight away, needs more throttle at a certain point, should turn sharper at a particular location, etc.), and such audio and hand gestures can be captured. Then, at a later point in time, one or more passengers in the back seat(s) 432*a/b/c* who are viewing the first user's 400 driving, along with the second user's 420 interactions, can learn from the driving and the critique/instructions. For example, the passengers can see movements, gestures, and any other recorded interactions by the corresponding avatars of the first and second users.

Thus, one application of aggregated asynchronous interactions being viewable is to enable users to critique each other's gameplay so that other users may learn from the gameplay and the critique. While the foregoing example has been described with reference to a driving simulation, it will be appreciated that such concepts can be applied to any type of game or interactive application for which asynchronous gameplay/interactions can be recorded and made available for later viewing.

Figure 5:
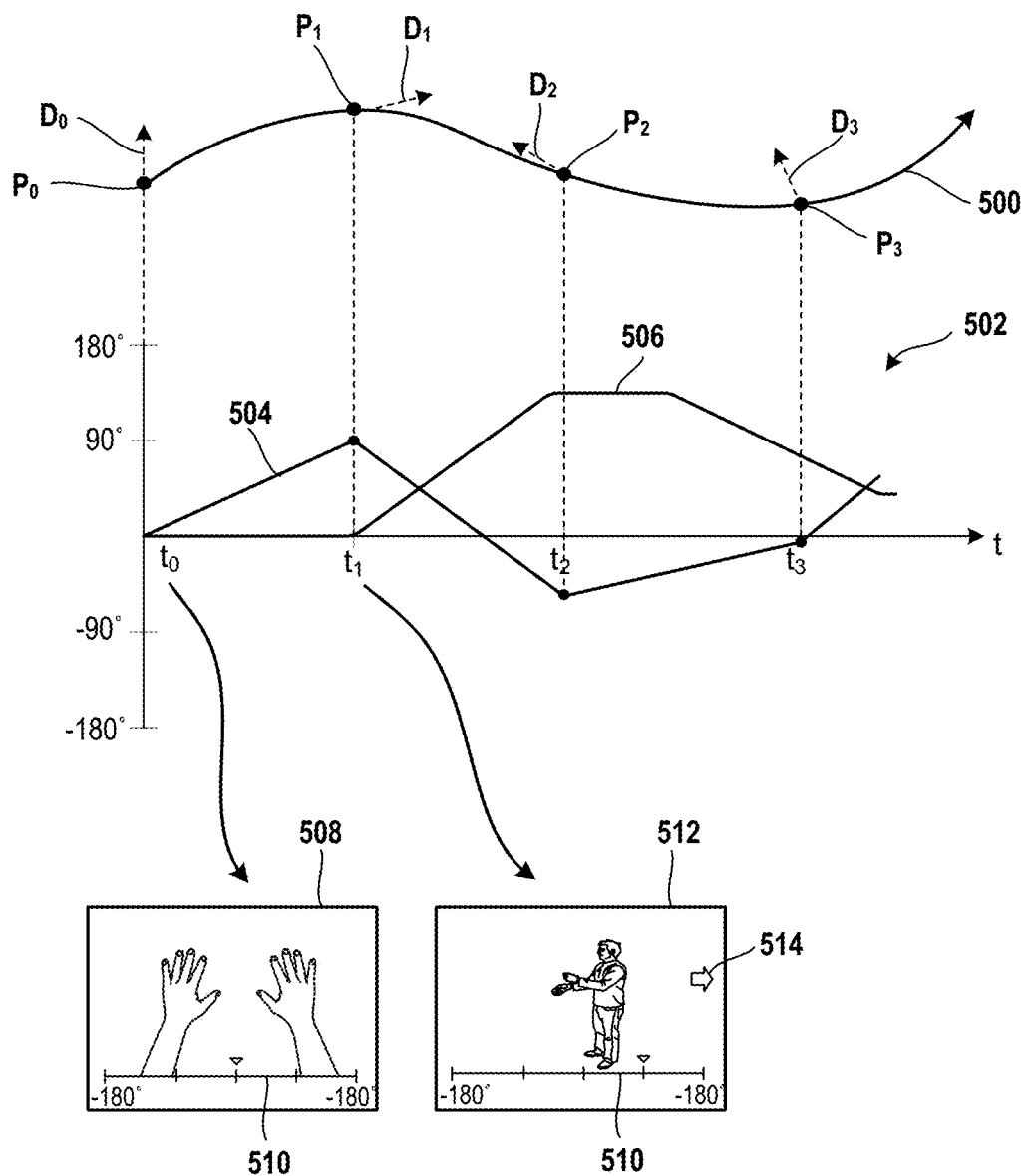
FIG. 5 conceptually illustrates changes in orientation of the view of a first user during a gameplay session, and changes in orientation of the view of a second user when viewing a playback of the first user's gameplay session, in accordance with implementations of the disclosure.

FIG. 5 conceptually illustrates changes in orientation of the view of a first user during a gameplay session, and changes in orientation of the view of a second user when viewing a playback of the first user's gameplay session, in accordance with implementations of the disclosure. In the illustrated implementation, the path 500 of the first user 400 through a virtual environment is shown. At various timepoints, the view direction of the first user 400 is shown by corresponding arrows. At time $t_0$, the first user 400 (or the virtual character/avatar representing or controlled by the first user 400) is shown having a location $P_0$ in the virtual environment, and having a view direction $D_0$. At time $t_1$, the first user 400 has moved to a location $P_1$, and has a view direction $D_1$. At time $t_2$, the first user 400 has moved to a location $P_2$, and has a view direction $D_2$. At time $t_3$, the first user 400 has moved to a location $P_3$, and has a view direction $D_3$.

When using a HMD to view a playback of another user's gameplay, simply viewing a recording of the user's gameplay may induce nausea or sickness on the part of the viewer, as such a first-person view of the gameplay may have changes in location and orientation of the view that are too fast or abrupt to be comfortable for the viewer. Therefore, in some implementations, a playback is provided wherein the orientation of the view is controlled by the viewer.

For example, in some implementations, the view of the second user 420 during the playback of the first user 400 gameplay is from the same locations for a given time during the gameplay, but the view direction (or view orientation) of the second user 420 can be determined by the second user 420. Thus, with continued reference to FIG. 5, when the second user 420 is viewing a playback of the first user 400 gameplay, then the view location of the second user 420 follows the same path 500 through the virtual environment from locations $P_0$ to $P_3$ and beyond as shown. However, the view direction/orientation for the second user 420 during the playback does not necessarily follow the same view direction as that of the first user 400 (i.e. from $D_0$ to $D_3$ and beyond).

In some implementations, the view direction of the second user 420 is entirely decoupled from the view direction of the first user 400, such that the view direction during the playback is entirely controlled by the second user 420. It will be appreciated that the view direction of the second user 420 can be controlled in response to various types of input, such as tracked movements of the second user 420 HMD device, input from a controller device operated by the second user 420, etc.

In some implementations, the view direction of the second user 420 is partially controlled by the view direction of the first user 400 and partially controlled by the second user 420. For example, in some implementations, the view direction of the second user 420 results from a combination of the first user 400 view direction and inputs from the second user 420. In some implementations, the view direction of the second user 420 is the same as the first user 400 view direction when the second user 420 HMD is in a predefined initial orientation (e.g. a home orientation or when the second user 420 is looking straight ahead), but deviates from the first user 400 view direction based on changes in the orientation of the second user 420 HMD. For example, when the second user 420 moves their HMD by turning their head to look to the right, then the view direction of the second user 420 is turned to the right relative to the view direction of the first user 400 at that time during the playback of the first user 400 gameplay.

In some implementations, the changes in orientation of the view direction of the first user 400 during playback are limited to a maximum rate of change. For example, in some implementations, changes in the view direction of the first user 400 that do not exceed a predefined maximum rate of change are permitted during playback viewing by the second user 420, whereas changes that exceed the predefined maximum rate of change are reduced to the predefined maximum rate of change. In such an implementation, the view direction of the second user 420 may lag the view direction of the first user 400 during certain times, and if the view direction of the first user 400 changes to a new direction during such time, then the view direction of the second user 420 is adjusted accordingly so as to move towards the new direction, subject to the same predefined maximum rate.

In some implementations, the view direction of the second user 420 during the playback is configurable in response to user input by the second user 420 to be toggled between various optional modes, including by way of example without limitation: being locked to the first user 400 view direction, being entirely decoupled from the first user 400 view direction and entirely controlled by the second user 420, and/or being partially controlled by the first user 400 view direction and partially controlled by the second user 420. In some implementations, the view direction of the second user 420 can be toggled in response to button input from a controller device operated by the second user 420.

In some implementations, the view direction of the second user 420 during playback of the gameplay is the same as the view direction of the first user 400 until the second user 420 moves their HMD (e.g. beyond a threshold amount away from an initial orientation), at which point the view direction of the second user 420 becomes decoupled from the view direction orientation the first user 400 (and entirely controlled by the second user 420). To return to the first user 400 view direction, the second user 420 may provide a predefined input, such as pressing a button or performing a predefined gesture or speaking a verbal command, by way of example without limitation.

With continued reference to FIG. 5, a graph 502 shows changes in the horizontal angle (in degrees) of the view direction of the first user 400 and the second user 420 over time, such that the view direction of the second user 420 is independent of the view direction of the first user 400 while the second user 420 views a playback of the first user 400 gameplay. The angle of the first user 400 view direction is shown by the curve 504, and the angle of the second user 420 view direction is shown by the curve 506.

At time $t_0$, the first user 400 has view direction $D_0$ at an angle of 0 degrees, and the second user 420 also has the same view direction at an angle of 0 degrees. However, as time progresses from $t_0$ to $t_1$, the view direction of the first user 400 changes to $D_1$ at an angle of about 90 degrees; whereas the view direction of the second user 420, which is independent of the view direction of the first user 400, does not change but remains at 0 degrees. At time $t_2$, the first user 400 view direction $D_2$ has moved to about −60 degrees, while the second user 420 view direction has moved to about 150 degrees. At time $t_3$, the first user 400 view direction $D_3$ has moved to about −15 degrees, while the second user 420 view direction has moved to about 90 degrees.

By way of example without limitation, at time $t_0$, the second user 420 is shown to have a view 508. As discussed above, the view is the same as that of the first user 400. In some implementations, an indicator 510 is provided to indicate the direction of the first user 400 view direction relative to that of the second user 420. In the illustrated implementation, the indicator 510 is in the form of a bar indicating degrees with a pointer that shows the direction of the first user 400 view direction at that time during the playback. As shown, the pointer is at zero, as the view direction of the second user 420 is the same as the view direction of the first user 400.

At time $t_1$, the second user 420 is shown to have a view 512. At this time, the view direction of the second user 420 is at 0 degrees whereas the view direction of the first user 400 is at 90 degrees as previously discussed. Thus, the view direction of the first user 400 is now +90 degrees relative to that of the second user 420. In the illustrated implementation, the indicator 510 thus shows the pointer at 90 degrees, showing the relative horizontal angle of the first user 400 view direction to the second user 420 view direction at time $t_1$. Additionally, in some implementations, a further indicator may be provided in the form of a visual cue such as an arrow 514, that indicates the direction of the first user 400 view direction relative to that of the second user 420.

Though implementations have been described with respect to a horizontal view direction, it will be appreciated that the principles of the present disclosure can be applied to the vertical view direction as well. For example, the indicator 510 may further indicate the vertical view direction of the first user 400.

Figure 6A:
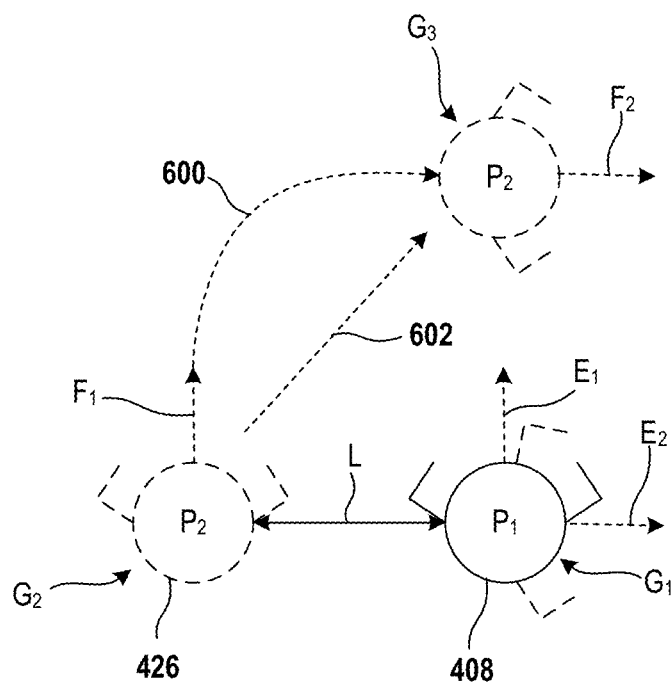
FIG. 6A illustrates a conceptual overhead view of virtual characters in a virtual environment showing the relationship of view locations and view directions in the virtual environment, in accordance with implementations of the disclosure.

FIG. 6A illustrates a conceptual overhead view of virtual characters in a virtual environment showing the relationship of view locations and view directions in the virtual environment, in accordance with implementations of the disclosure. In the illustrated implementation, the virtual character 408 represents a first user 400 and further defines the view location or perspective and the view direction of the first user 400 view. At an initial time, the first user 400 view has a view direction $E_1$ in the virtual environment.

In some implementations, a second user 420 viewing the first user 400 gameplay may be represented by a virtual character 426. The virtual character 426 as shown defines the view location or perspective and the view direction for the second user 420 view. In the illustrated implementation, at the initial time, the second user 420 view has a view direction $F_1$ in the virtual environment that is substantially similar to the view direction $E_1$.

In some implementations, the view of the second user 420 is configured to have a predefined spatial relationship to the view of the first user 400. The predefined spatial relationship can be defined by certain predefined parameters, such as a predefined distance of the second user 420 view location from the first user 400 view location, and a predefined angular location of the second user 420 view location relative to the first user 400 view location. As in the illustrated implementation, the respective virtual characters of the first user 400 and second user 420 define their view locations, the virtual character 426 can have a predefined spatial relationship to the virtual character 408. As shown, the virtual character 408 has a location $G_1$ in the virtual environment, and the virtual character 426 is separated from the virtual character 408 by a distance L in the virtual environment at a location $G_2$. Furthermore, the virtual character 426 is laterally located to the left of the virtual character 408.

The virtual character 408 that defines the first user 400 view is shown facing in a direction $E_1$. If direction $E_1$ is considered to be zero degrees, then at the same time during playback of the first user 400 gameplay, the location of the virtual character 426 that defines the second user 420 view has an angular location relative to the virtual character 408 of approximately −90 degrees (i.e. approximately 90 degrees in a counterclockwise direction, when considered from an overhead perspective). By locating the virtual character 426 in proximity to the virtual character 408 at a predefined relative location, the second user 420 can experience the playback in a more natural-feeling participatory way than if the second user 420 were to view the playback from the specific perspective of the virtual character 408. Thus an enhanced experience can be provided despite the interaction being asynchronous.

However, such an arrangement raises an issue of how to maintain such a spatial relationship during the course of the gameplay. For rigid maintenance of such a spatial relationship in real-time would mean the view location of the second user 420 as defined by the virtual character 426 could move very rapidly as a result of rapid movements (changes in location and/or orientation) of the virtual character 408, in order to maintain the spatial relationship in real-time. This could result in discomfort for the second user 420 resulting from too much movement of their view location. For example, if the first user 400 rapidly turned the virtual character 408 clockwise 90 degrees to a view direction $E_2$ (such as by operating a controller device or turning an HMD), and the spatial relationship of the virtual character 426 to the virtual character 408 were maintained in real-time, then the virtual character 426 would simultaneously move from location $G_2$ (and a view direction $F_1$) to a location $G_3$ (and a view direction $F_2$) rapidly traversing a path 600 in the process. In such a scenario, as can be seen, even fairly small changes in orientation of the virtual character 408 can result in significant movements of the virtual character 426.

Therefore, in some implementations, the view location and/or orientation of the second user 420 is allowed to drift from its predefined spatial relationship to the view location and/or orientation of the first user 400. For example, in some implementations, the virtual character 426 moves in response to movements of the virtual character 408 in order to maintain a predefined spatial relationship, but the movement of the virtual character 426 is limited to a predefined maximum velocity of movement in the virtual environment. In some implementations, the movement of the virtual character 426 is limited to a predefined maximum acceleration (change in velocity). It should be appreciated that the velocity/acceleration may pertain to translation as well as angular movements of the virtual character 426 in the virtual environment.

When the spatial relationship of the virtual character 426 to the virtual character 408 is not maintained in real-time (such as by setting a maximum velocity/acceleration as described above), then the location/orientation of the virtual character 426 will lag its intended (or correct) location/orientation based on the predefined spatial relationship. For example, as indicated in the illustrated implementation, when the virtual character 408 rotates 90 degrees clockwise, then the intended location/orientation of the virtual character 426 is at location $G_3$ and direction $F_2$. However, as the spatial relationship is not maintained in real-time, then it will be the case that the virtual character 408 has turned 90 degrees clockwise, while the virtual character 426 has not reached the location $G_3$ and orientation $F_2$.

In view of this, it can be faster for the virtual character 426 to traverse a more direct path 602 rather than traversing the path 600 in order to reach the location $G_3$ and orientation $F_2$. In some implementations, for each frame (or predefined number of frames or predefined amount/unit of elapsed time) an optimal direction from the virtual character 426 current location/orientation to the intended location/orientation is determined (e.g. direction that requires the least time to reach the intended location/orientation), and the virtual character 426 is caused to traverse the virtual environment in the optimal direction (e.g. subject to constraints such as maximum velocity/acceleration). For example, the location/orientation of the virtual character in the next frame may be linearly interpolated along the optimal direction. It will be appreciated that as the virtual character 408 may continue to move, then the optimal direction of movement for the virtual character 426 may continue to change from one frame to the next. In this manner, the virtual character 426 is moved in an efficient manner towards its intended location/orientation in keeping with the predefined spatial relationship.

Figure 6B:
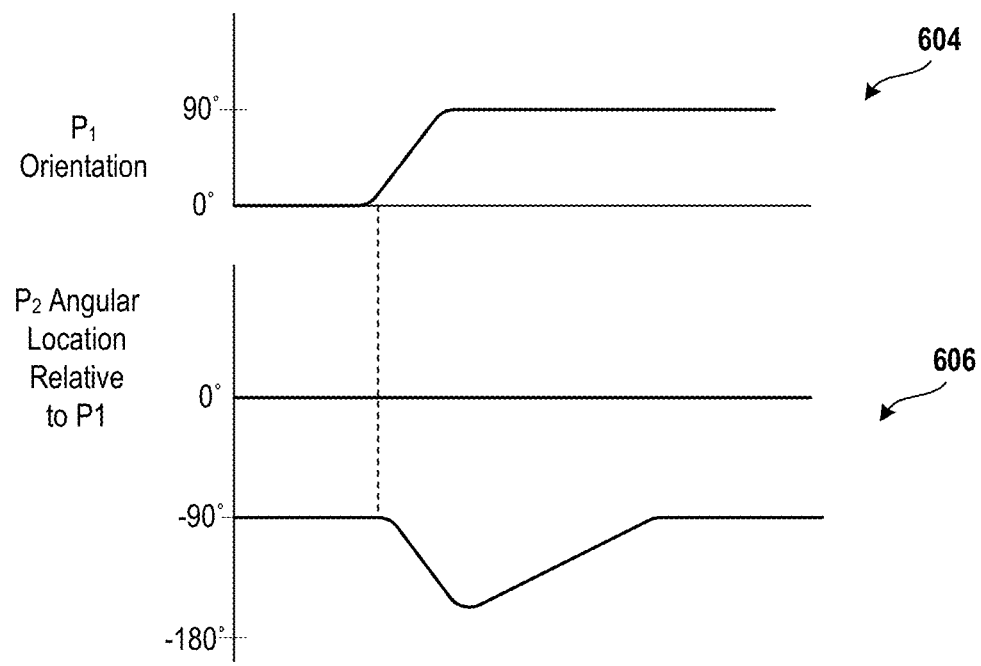
FIG. 6B illustrates graphs showing the horizontal angular orientation of the virtual character 408 (ref. 604) and the angular location of the virtual character 426 relative to the angular orientation of the virtual character 408 (ref. 606), in accordance with implementations of the disclosure.

FIG. 6B illustrates graphs showing the horizontal angular orientation of the virtual character 408 (ref. 604) and the angular location of the virtual character 426 relative to the angular orientation of the virtual character 408 (ref. 606), in accordance with implementations of the disclosure. Again, as has been noted, the orientation of the virtual character 408 and 426 are synonymous with the view direction of the first user 400 and second user 420, respectively. At an initial time $t_0$, the virtual character 408 exhibits an orientation of zero degrees (direction $E_1$), and the virtual character 426 exhibits a angular location of −90 degrees relative to the location of the virtual character 408 (which is in accordance with the predefined spatial relationship of the virtual character 426 to the virtual character 408). From time $t_1$ to $t_2$, the angular orientation of the virtual character 408 changes from zero to 90 degrees (rotates from $E_1$ to $E_2$). During this time from $t_1$ to $t_2$, the angular location of virtual character 426 relative to virtual character 408 may lag the intended angular location (which would be −90 degrees according to the predefined spatial relationship) and thus increases in the negative direction to −165 degrees before trending back towards the −90 degree predefined spatial relationship.

Figure 7:
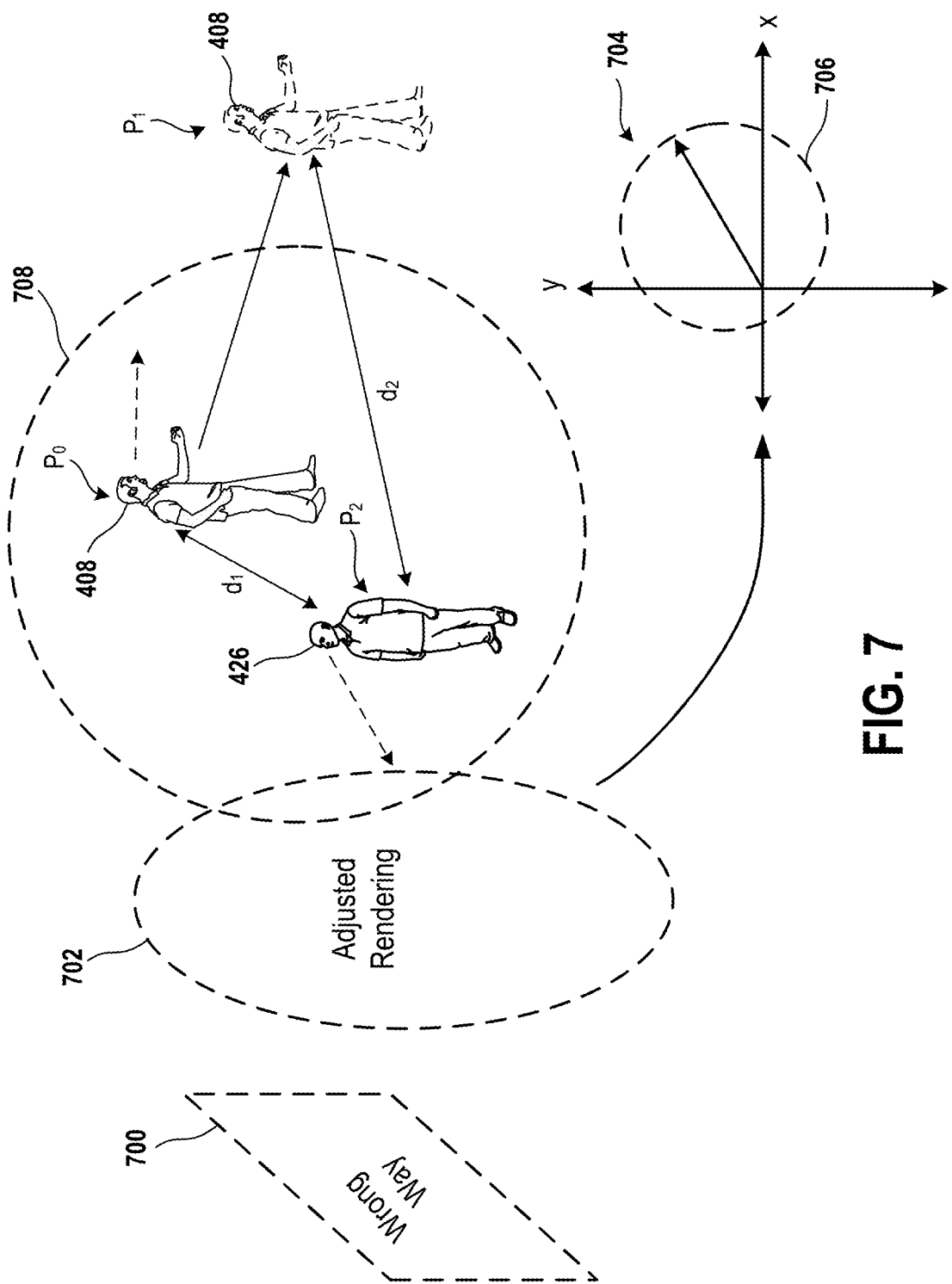
FIG. 7 conceptually illustrates a second user 420 able to navigate and view independently of a first user in a virtual environment when viewing a playback of the first user's gameplay, in accordance with implementations of the disclosure.

FIG. 7 conceptually illustrates a second user 420 able to navigate and view independently of a first user in a virtual environment when viewing a playback of the first user's gameplay, in accordance with implementations of the disclosure. At an initial time in the playback, the first user 400 has a view from a location $P_0$ in the virtual environment. As noted, the first user 400 view can be defined by the location and orientation of a representative virtual character 408. During the playback of the first user 400 gameplay, the second user 420 can in some implementations have the ability to navigate their view independently of the view of the first user 400. This can include navigating the location and orientation of the view independently of the first user 400 view. The second user 420 view may be defined by a representative virtual character 426 that is independently navigated in the virtual environment by the second user 420. Because the second user 420 may independently determine their view, e.g. by moving the virtual character 426, the location and orientation of the second user 420 virtual character 426 may not track the location and orientation of the first user 400 virtual character 408, as unlike a previously described implementation, there is no spatial relationship between the virtual characters that is being maintained.

Therefore, for example, when the virtual character 408 moves from a position $P_0$ to position $P_1$, the virtual character 426 may not follow. And the second user 420 view of the virtual environment may become more detached from the first user 400 view, as the location of the virtual character 426 becomes more distant from the location of the virtual character 408. Therefore, in some implementations, indicators are provided in the virtual environment to prompt the second user 420 to move towards the location of the first user 400 (e.g. move the virtual character 426 towards the location of the virtual character 408).

In some implementations, a notification is graphically displayed to the second user 420 indicating that they are looking or moving in a direction that is away from where the virtual character 408 of the first user 400 is located, and/or prompting the second user 420 to move towards the virtual character 408. In some implementations, such a graphical notification 700 is rendered in the virtual environment at a location or in a vicinity where the second user 420 is currently looking. In some implementations, an audio notification can be provided, prompting the second user 420 to move towards the first user 400.

In some implementations, such notifications are triggered when the distance between the virtual character 426 and the virtual character 408 exceeds a predefined threshold distance in the virtual environment. For example, when the virtual character 408 is at position $P_0$ and the virtual character 426 is at position $P_2$, the distance between the virtual characters $d_1$ may be less than the threshold distance, and therefore even though the second user 420 may not be looking in the same direction as, or towards, the first user 400, no notification is provided as the virtual character 426 is still close to the virtual character 408. However, when the virtual character 408 moves to position $P_1$ the distance between virtual character 426 and virtual character 408 increases to $d_2$ which exceeds the predefined threshold distance, and therefore a notification is provided to the second user 420 to prompt or otherwise encourage the second user 420 to move towards the first user 400.

In some implementations, other forms of notifying or prompting the second user 420 to move towards the first user 400 can be provided. For example, the rendering of the virtual environment can be adjusted to make a region 702 that the second user 420 is viewing less visually interesting, thereby encouraging the second user 420 to look elsewhere and move towards the first user 400. Various rendering properties/parameters can be adjusted to make the scene less visually interesting, such as reducing color saturation, reducing contrast, reducing lighting levels, simplifying surface textures, reducing the number/density of virtual objects, reducing graphical complexity, etc. In some implementations, audio can be adjusted to reduce auditory interest, such as by reducing sound volume levels of sounds from the region 702, adjusting audio settings (e.g. adjusting frequency, such as reducing treble/higher frequencies to make sounds more muted), reducing volume or eliminating background soundtrack audio (e.g. background music), reducing number of sounds generated, etc.

In some implementations, the rendering of the virtual environment is adjusted based on the location of the virtual character 426 relative to the location of the virtual character 408. For example, a graph 704 conceptually represents the virtual environment, and is centered at the location of the virtual character 426 in the virtual environment. In some implementations, the rendering of the virtual environment is adjusted to reduce visual interest beyond a certain boundary 706 whose distance from the virtual character 426 varies based on the relative location of the virtual character 426 to the virtual character 408. In some implementations, the distance of the boundary 706 from the virtual character 426 is greater as the direction (radial direction from the virtual character 426 to the boundary location) is towards the virtual character 408 and reduced as the direction is away from the virtual character 408.

In some implementations, the rendering of the virtual environment is adjusted (such as indicated above to reduce the level of visual interest) based on the location and/or orientation of the virtual character 408. For example, in some implementations, regions of the virtual environment that exceed a predefined distance from the location of the virtual character 408 are rendered in an adjusted manner to reduce visual interest in such regions. In some implementations, a region of interest 708 can be defined based on the location and/or orientation of the virtual character 408. The region of interest is rendered at normal settings, whereas regions falling outside of the region of interest 708 are rendered at adjusted settings to reduce visual interest in such regions.

In some implementations, the region of interest is defined based on the location and the orientation of the virtual character 408. For example, the distance from the location of the virtual character 408 defining the boundary of the region of interest is increased towards the direction of the virtual character 408 orientation and reduced towards the direction opposite the virtual character 408 orientation.

Figure 8:
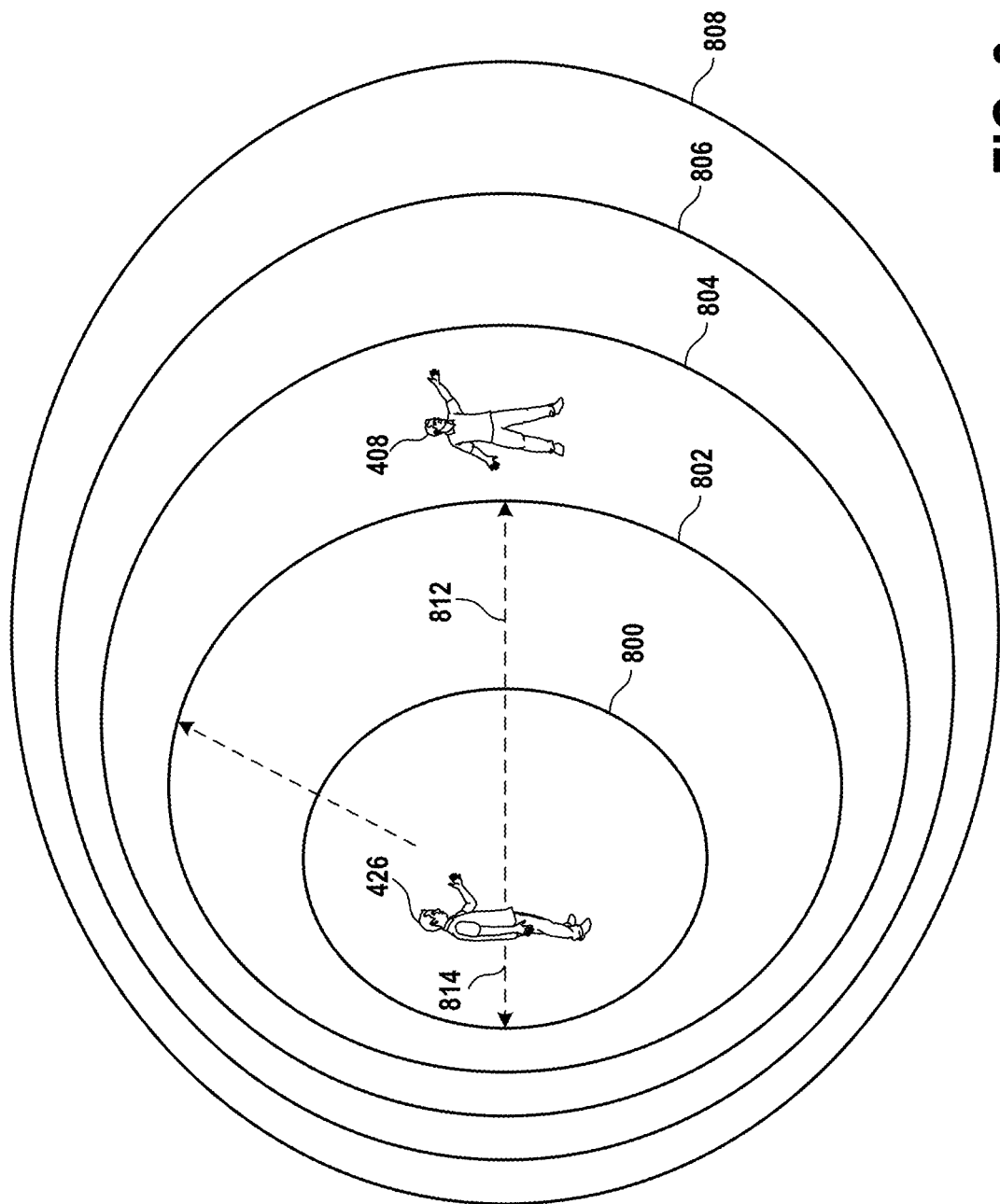
FIG. 8 conceptually illustrates virtual characters in a virtual environment during a playback of a first user 400 gameplay with adjusted rendering, in accordance with implementations of the disclosure.

FIG. 8 conceptually illustrates virtual characters in a virtual environment during a playback of a first user 400 gameplay with adjusted rendering, in accordance with implementations of the disclosure. In the illustrated implementation, the rendering is adjusted to reduce visual interest, and the amount of adjustment increases with increasing distance from the virtual character 426. Further in the illustrated implementation, several concentric curves 800, 802, 804, 806, and 808 are isometric lines indicating the amount of adjustment. Along a given one of the curves, the amount of rendering adjustment is the same, with outer curves indicating a greater level of adjustment than inner curves (e.g. along curve 808 the amount of rendering adjustment is greater than along curve 806, which is greater than along curve 804, etc.). In some implementations, the concentric curves can indicate amounts of audio adjustment to reduce auditory interest.

Further as shown, in the direction (ref. 812) from the virtual character 426 towards the virtual character 408, the isometric curves are spaced further apart, meaning that in the direction that is towards the virtual character 408, the reduction in rendering quality occurs less rapidly with distance than in the direction (ref. 814) that is away from the virtual character 408. In some implementations, for a given isometric curve, its distance from the virtual character 426 increases as a direction defined from the virtual character 426 to a given point on the isometric curve becomes directed more towards the virtual character 408.

Figure 9:
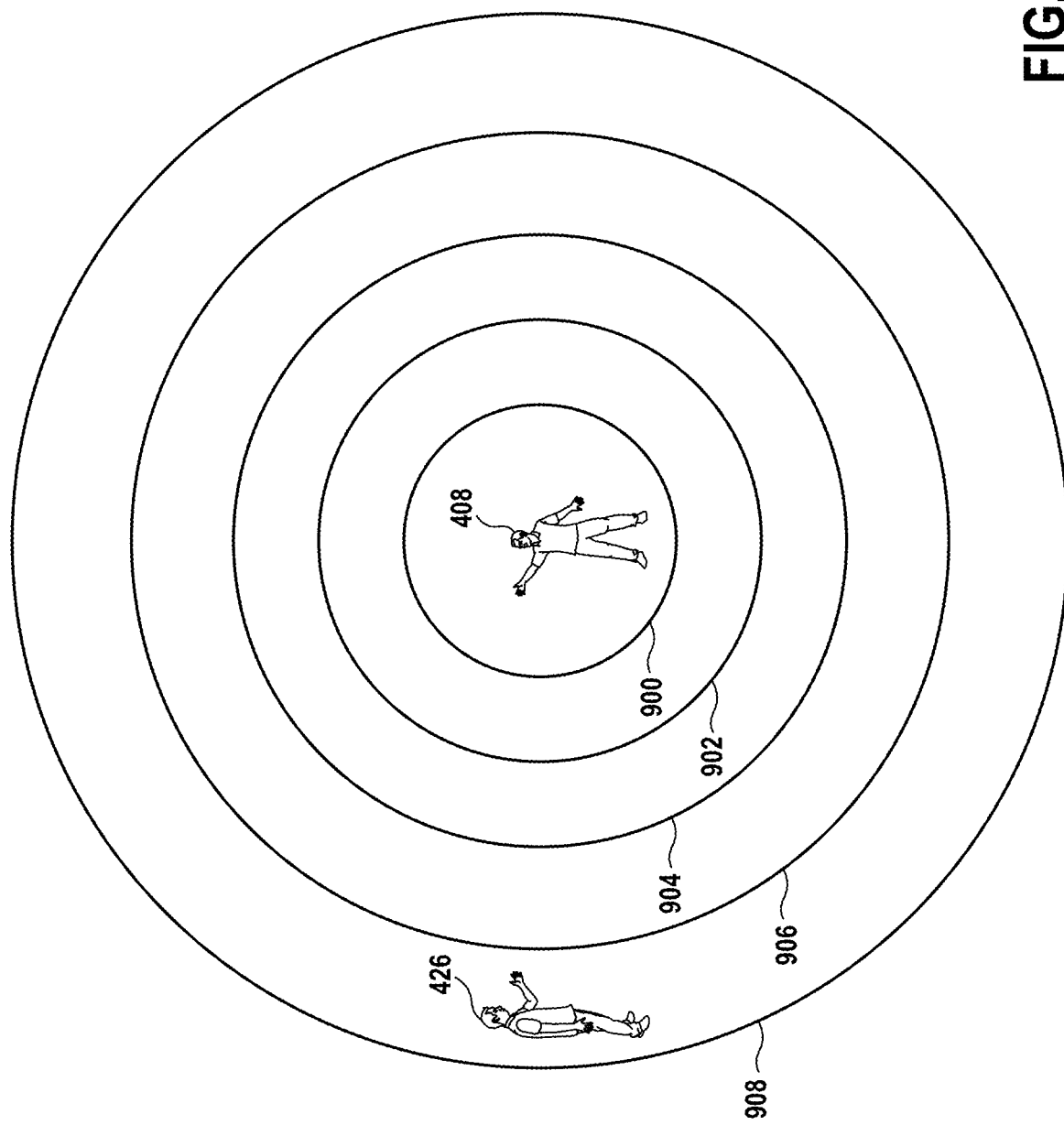
FIG. 9 conceptually illustrates virtual characters in a virtual environment during a playback of a first user 400 gameplay with adjusted rendering, in accordance with implementations of the disclosure.

FIG. 9 conceptually illustrates virtual characters in a virtual environment during a playback of a first user 400 gameplay with adjusted rendering, in accordance with implementations of the disclosure. In the illustrated implementation, the rendering is adjusted to reduce visual interest, and the amount of adjustment increases with increasing distance from the virtual character 408. Further in the illustrated implementation, several concentric curves 900, 902, 904, 906, and 908 are isometric lines indicating the amount of adjustment. Along a given one of the curves, the amount of rendering adjustment is the same, with outer curves indicating a greater level of adjustment than inner curves (e.g. along curve 908 the amount of rendering adjustment is greater than along curve 906, which is greater than along curve 904, etc.). In some implementations, the concentric curves can indicate amounts of audio adjustment to reduce auditory interest.

Figure 10:
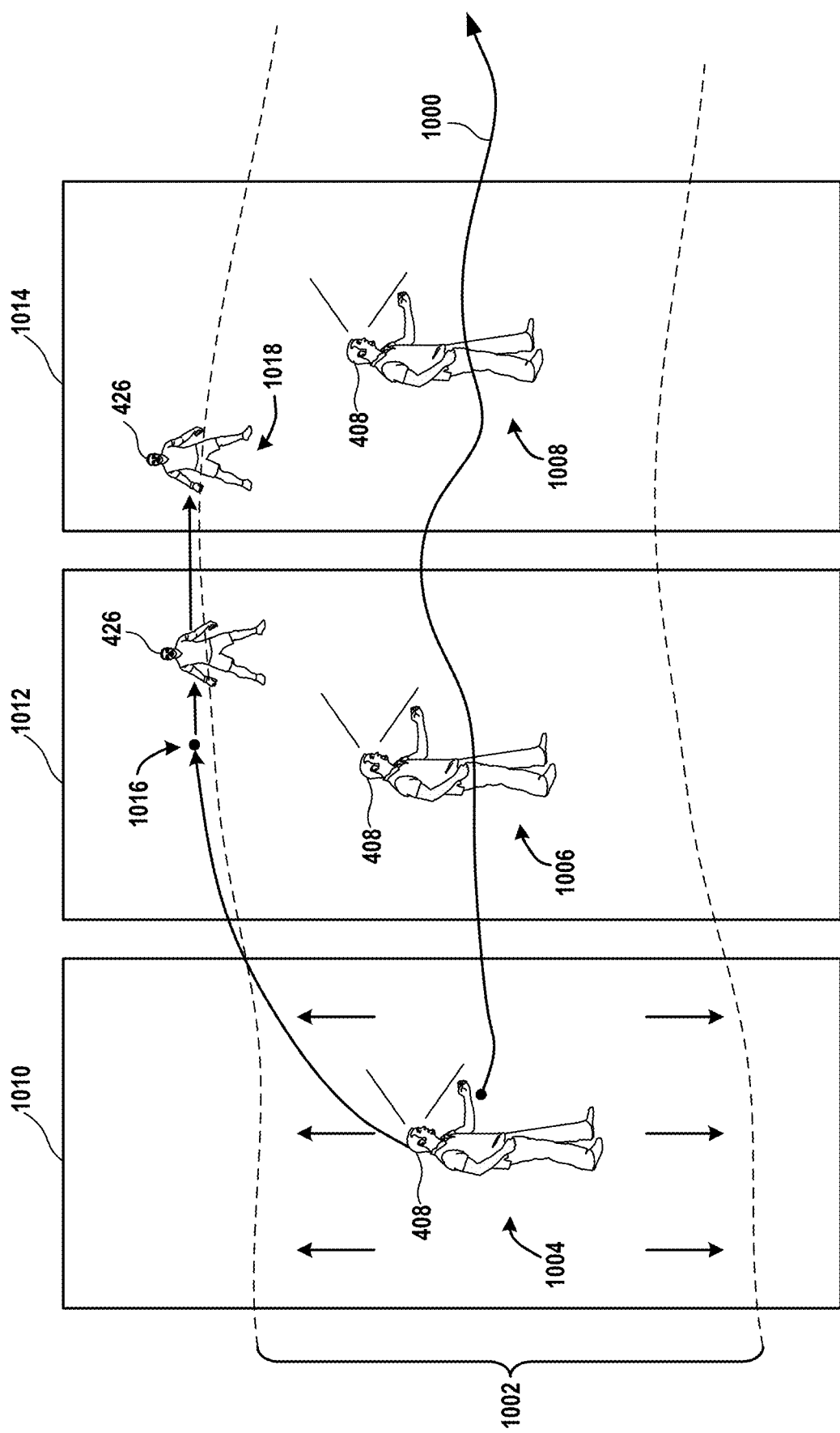
FIG. 10 conceptually illustrates a path traversed by a virtual character of a first user 400, and a virtual character of a second user 420 being maintained in proximity to the virtual character of the first user 400, in accordance with implementations of the disclosure.

FIG. 10 conceptually illustrates a path traversed by a virtual character of a first user 400, and a virtual character of a second user 420 being maintained in proximity to the virtual character of the first user 400, in accordance with implementations of the disclosure. As shown, the virtual character 408 is representative of the first user 400 in a virtual environment, and the virtual character 408 traverses a path 1000 through the virtual environment during a gameplay session.

In some implementations, when the second user 420 views a playback of the first user 400 gameplay, then a region 1002 of the virtual environment that is proximate to the virtual character 408 can be prioritized for viewing. For example, the region 1002 may be rendered with normal rendering settings, whereas regions outside of the region 1002 are rendered with adjusted settings so as to reduce visual interest.

During the course of traversing the path 1000 in the virtual environment, the virtual character 408 may move from a location 1004 to a location 1006, to a location 1008, as shown in the illustrated implementation. In some implementations, the region 1002 of the virtual environment that is prioritized is substantially defined by regions of the virtual environment that are viewed by the first user 400 (or towards which the virtual character 408 was oriented) during the first user 400 session.

As has been noted, in some implementations, the view of the second user 420 can be the same as the view of the first user 400 during the first user 400 session. However, in some implementations, the second user 420 may change their view to be independent of the first user 400 view. For example, as the virtual character 408 moves from location 1004 to location 1006, the second user 420 may move their view location to a location 1016, thereby diverging from the view of the first user 400. This may be defined by movement of the second user 420 view location from the virtual character 408 to a location 1016. In so doing, the second user 420 may be represented by a virtual character 426 in the virtual environment, and thus the view location of the second user 420 being defined by the location of the virtual character 426 and the view direction of the second user 420 being defined by the orientation of the virtual character 426.

In some implementations, as the virtual character 408 moves along the path 1000 through the virtual environment, a window or region around the virtual character 408 is defined within which the second user 420 virtual character 426 is limited. That is, as the virtual character 408 moves, the virtual character 426 is required to be within a certain vicinity of the virtual character 408. By way of example without limitation, in the illustrated implementation, when the virtual character 408 is as location 1004, then virtual character 426 is limited to a region 1010 proximate to the virtual character 408. Then when the virtual character 408 moves to location 1006, the region shifts to a region 1012 proximate to the virtual character 408 within which the virtual character 426 is limited. When the virtual character 408 moves to location 1008, and the proximate region shifts to region 1014, the virtual character 426 may be forced to move from location 1016 to location 1018 so as to be maintained within the proximate region of the virtual character 408.

Figure 11:
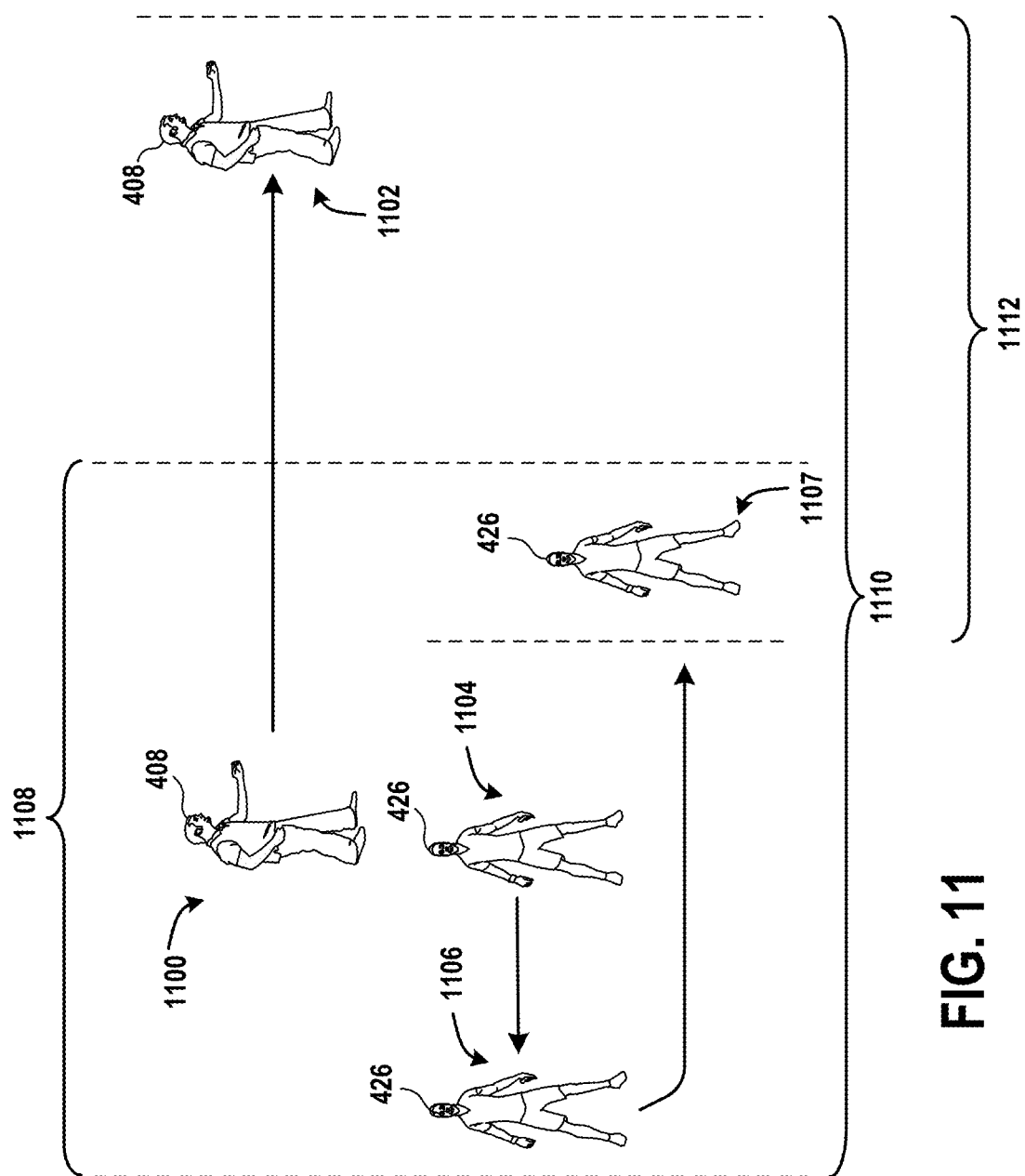
FIG. 11 conceptually illustrates virtual characters in a virtual environment and changes to regions within which a virtual character can be positioned, in accordance with implementations of the disclosure.

FIG. 11 conceptually illustrates virtual characters in a virtual environment and changes to regions within which a virtual character can be positioned, in accordance with implementations of the disclosure. In the illustrated implementation, the locations of the virtual character 408 and the virtual character 426 define the view locations of a first user 400 and second user 420, respectively. Then the virtual character 408 is positioned at a location 1100, then the virtual character 426 is permitted to move within a region 1108 that includes (and may be proximate to) the virtual character 408. In some implementations, the outer boundary of the region 1108 is defined by a predefined distance from the location of the virtual character 408. For example, the virtual character 426 may move from a location 1104 to another location 1106 within the virtual environment as both locations are within the region 1108. However, the virtual character 426 is not permitted to move beyond the boundaries of the region 1108 when the virtual character 408 is positioned at location 408, and thus the view location of the second user 420 is therein confined.

At a subsequent time, the virtual character 408 moves away from the virtual character 426 from location 1100 to location 1102, while the virtual character 426 remains at location 1106. Rather than shifting the region 1108 and compelling the virtual character 426 to be within the shifted region as it is moved, the region is expanded to a region 1110 that encompasses both the virtual character 408 and the virtual character 426, such that the extent of the boundary reaches to the location of the virtual character 426 but no further (away from the virtual character 408). Thus, the virtual character 426 is not forced to move in response to movement of the virtual character 408. However, the virtual character 426 is not permitted to move beyond the boundary of the expanded region 1110, and therefore may not be permitted to move any further away from the virtual character 408.

When the virtual character 426 moves towards the virtual character 408 from the location 1106 to the location 1107, then the boundary of the region is shifted to define a region 1112 within which the virtual character 426 is permitted to move. That is, the region is contracted as the virtual character 426 moves towards the virtual character 408. In some implementations, as the virtual character 426 moves towards the virtual character 408, the region within which the virtual character is permitted to move is contracted until the virtual character 426 is within a predefined distance of the virtual character 408. In other words, the boundary of the permitted region is shifted such that its outer extent is defined by the location of the virtual character 426 until the virtual character 426 is within a predefined region proximate to the virtual character 408, at which point the boundary is defined by the predefined region's parameters (e.g. predefined distance from the virtual character 408). In this manner, the region within which the virtual character 426 is permitted to move has a "normal" setting (e.g. predefined distance from or other region shape oriented about the virtual character 408) that is maintained when the virtual character 426 is within the region. However, the region may expand or contract as needed depending upon whether the virtual character 408 or the virtual character 426 is initiating movement. The region may expand if the virtual character 408 initiates movement away from the virtual character 426, and may contract if the virtual character 426 initiates movement towards the virtual character 408.

Figure 12:
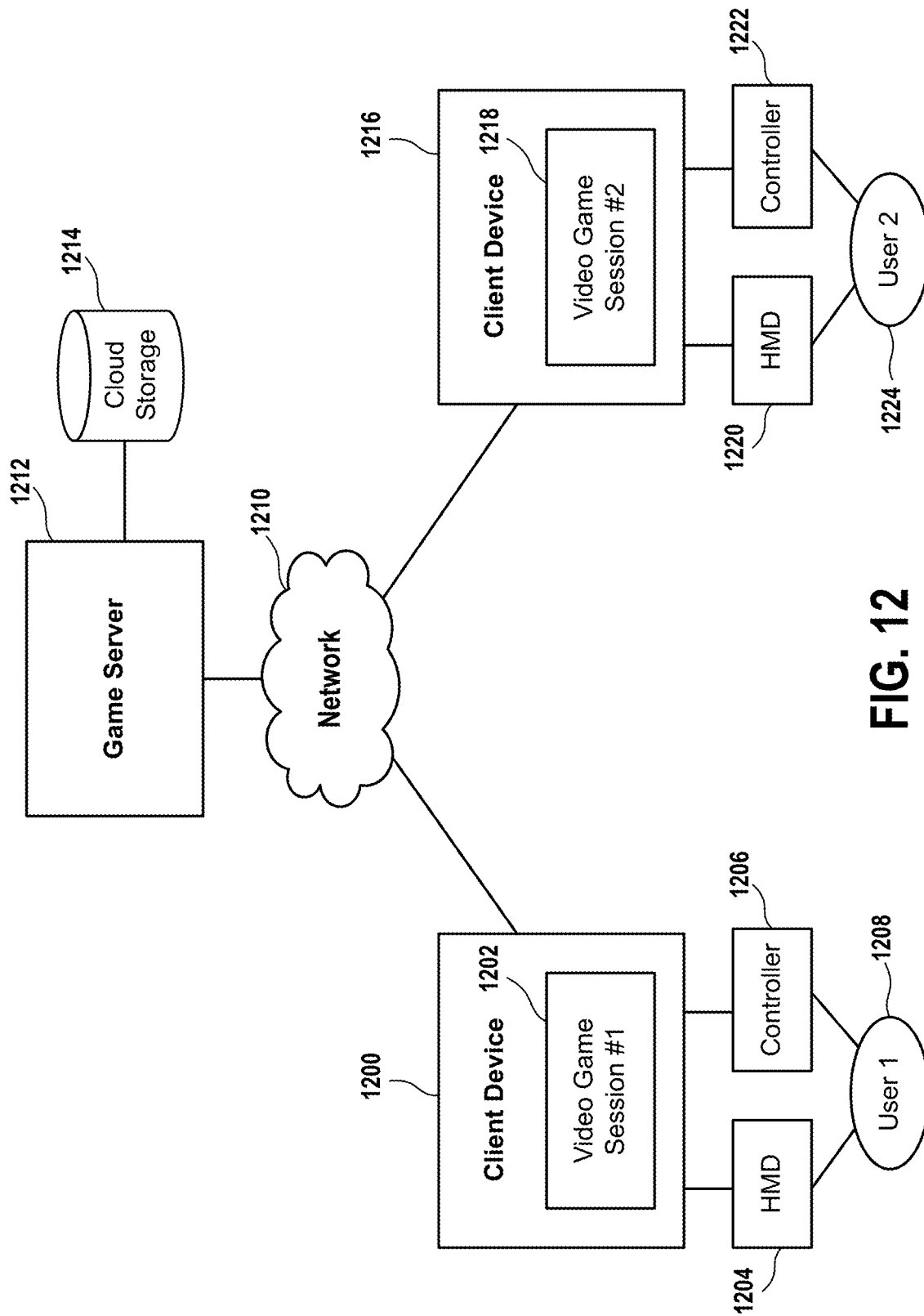
FIG. 12 illustrates a system for enabling asynchronous interactions between HMD users, in accordance with implementations of the disclosure.

FIG. 12 illustrates a system for enabling asynchronous interactions between HMD users, in accordance with implementations of the disclosure. As shown, a client device 1200 executes a first session 1202 of a video game. Gameplay metadata generated from the execution of the first session 1202 of the video game is recorded. The gameplay metadata can include game state values generated by the execution of the first session of the video game.

The execution of the first session is driven by interactive gameplay of the video game by a first user 1208 using a first head-mounted display (HMD) 1204. The execution of the first session renders a first view of a virtual environment of the video game for presentation through the first HMD 1204. The first view is defined from a first location in the virtual environment determined by the interactive gameplay, and the first view is further based on tracked movement of the first HMD 1204. The tracked movement of the first HMD 1204 can include a tracked orientation of the first HMD 1204 in a first local environment in which the first HMD 1204 is disposed, such that an orientation of the first view in the virtual environment is determined by the tracked orientation of the first HMD 1204.

The execution of the first session 1202 can include processing input data generated from the interactive gameplay by the first user 1208, and the gameplay metadata can include such input data. The input data can be generated via an input device such as a controller 1206 operated by the first user 1208.

After completion of the first session 1202 of the video game, the gameplay metadata is transmitted to another client device 1216. The client device 1216 executes a second session 1218 of the video game using the gameplay metadata to recreate gameplay events from the first session in the second session. The execution of the second session 1218 renders a second view of the virtual environment for presentation through a second HMD 1220. The second view is defined from a second location in the virtual environment that is determined based on the first location (from the first session) in the virtual environment. The second view is further defined based on tracked movement of the second HMD 1220. The tracked movement of the second HMD can include a tracked orientation of the second HMD in a second local environment in which the second HMD is disposed, such that an orientation of the second view in the virtual environment is determined by the tracked orientation of the second HMD.

As described above, in some implementations, the first location in the virtual environment is a predefined first position in a virtual vehicle that is disposed in the virtual environment, and the second location in the virtual environment is a predefined second position in the virtual vehicle. For example, the predefined first position in the virtual vehicle can be a driver position in the virtual vehicle, and the predefined second position in the virtual vehicle can be a passenger position in the virtual vehicle.

Furthermore, the execution of the second session 1218 can include processing input data generated from interactivity by the second user 1224. Such input data can be generated via an input device such as a controller 1224 operated by the second user 1224.

In the illustrated implementation, the first session 1202 is executed by a client device 1200 that is remote to the client device 1216 that executes the second session 1218. The client device 1200 and the client device 1216 are both connected to a network 1210. The gameplay metadata is transmitted over the network 1210. In some implementations, the gameplay metadata generated from the first session 1202 is communicated over the network 1210 to a game server 1212, which stores the gameplay metadata to a cloud storage 1214. The gameplay metadata is retrieved by the game server 121 from the cloud storage 1214 and transmitted to the client device 1216 when requested by the client device 1216 for execution of the second session 1218.

In some implementations, the gameplay metadata is transmitted directly from the client device 1200 to the client device 1216 over the network 1210.

In some implementations, the second view of the virtual environment that is presented through the second HMD 1220 is not necessarily based on the location of the first view; however, the second view is defined from a second location in the virtual environment that is determined based on the tracked movement of the second HMD 1220. The second location can be further determined using input data generated from interactivity with the second session 1218 of the video game by the second user 1224. For example, the input data may be generated via a controller/input device 1222 operated by the second user 1224.

In some implementations, the rendering of the second view is configured to have a setting that is adjusted based on the orientation of the second view relative to the first location of the first view in the virtual environment. For example, this may include adjustment of a level of detail of the rendering of the second view, such that the level of detail is increased when the orientation of the second view is towards the first location of the first view, and the level of detail is decreased when the orientation of the second view is away from the first location of the first view. The level detail can be defined by aspects such as an amount of virtual objects, an amount of color saturation, an amount of texture, an amount of shading, a level of resolution, and/or a complexity of graphics.

Figure 13:
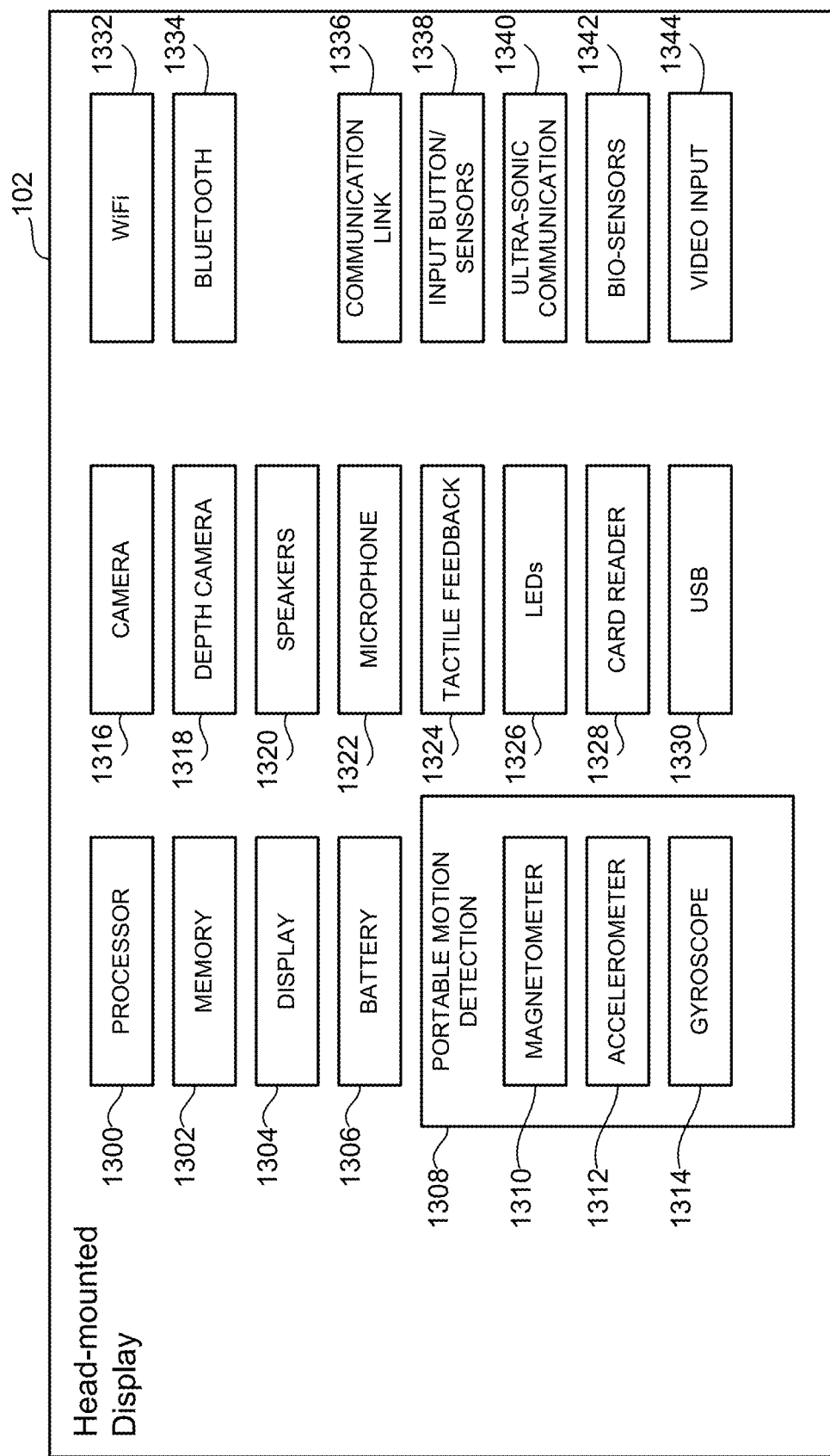
FIG. 13 illustrates components of a head-mounted display, in accordance with an embodiment of the disclosure.

With reference to FIG. 13, a diagram illustrating components of a head-mounted display 102 is shown, in accordance with an embodiment of the disclosure. The head-mounted display 102 includes a processor 1300 for executing program instructions. A memory 1302 is provided for storage purposes, and may include both volatile and non-volatile memory. A display 1304 is included which provides a visual interface that a user may view. A battery 1306 is provided as a power source for the head-mounted display 102. A motion detection module 1308 may include any of various kinds of motion sensitive hardware, such as a magnetometer 1310, an accelerometer 1312, and a gyroscope 1314.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1312 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 1310 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 1312 is used together with magnetometer 1310 to obtain the inclination and azimuth of the head-mounted display 102.

In some implementations, the magnetometers of the head-mounted display are configured so as to be read during times when electromagnets in other nearby devices are inactive.

A gyroscope is a device for measuring or maintaining orientation, based on the principles of angular momentum. In one embodiment, three gyroscopes 1314 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1316 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 1318 may be included in the head-mounted display 102 for sensing depth information of objects in a real environment.

The head-mounted display 102 includes speakers 1320 for providing audio output. Also, a microphone 1322 may be included for capturing audio from the real environment, including sounds from the ambient environment, speech made by the user, etc. The head-mounted display 102 includes tactile feedback module 1324 for providing tactile feedback to the user. In one embodiment, the tactile feedback module 1324 is capable of causing movement and/or vibration of the head-mounted display 102 so as to provide tactile feedback to the user.

LEDs 1326 are provided as visual indicators of statuses of the head-mounted display 102. For example, an LED may indicate battery level, power on, etc. A card reader 1328 is provided to enable the head-mounted display 102 to read and write information to and from a memory card. A USB interface 1330 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A WiFi module 1332 is included for enabling connection to the Internet or a local area network via wireless networking technologies. Also, the head-mounted display 102 includes a Bluetooth module 1334 for enabling wireless connection to other devices. A communications link 1336 may also be included for connection to other devices. In one embodiment, the communications link 1336 utilizes infrared transmission for wireless communication. In other embodiments, the communications link 1336 may utilize any of various wireless or wired transmission protocols for communication with other devices.

Input buttons/sensors 1338 are included to provide an input interface for the user. Any of various kinds of input interfaces may be included, such as buttons, touchpad, joystick, trackball, etc. An ultra-sonic communication module 1340 may be included in head-mounted display 102 for facilitating communication with other devices via ultra-sonic technologies.

Bio-sensors 1342 are included to enable detection of physiological data from a user. In one embodiment, the bio-sensors 1342 include one or more dry electrodes for detecting bio-electric signals of the user through the user's skin.

A video input 1344 is configured to receive a video signal from a primary processing computer (e.g. main game console) for rendering on the HMD. In some implementations, the video input is an HDMI input.

The foregoing components of head-mounted display 102 have been described as merely exemplary components that may be included in head-mounted display 102. In various embodiments of the disclosure, the head-mounted display 102 may or may not include some of the various aforementioned components. Embodiments of the head-mounted display 102 may additionally include other components not presently described, but known in the art, for purposes of facilitating aspects of the present disclosure as herein described.

Figure 14:
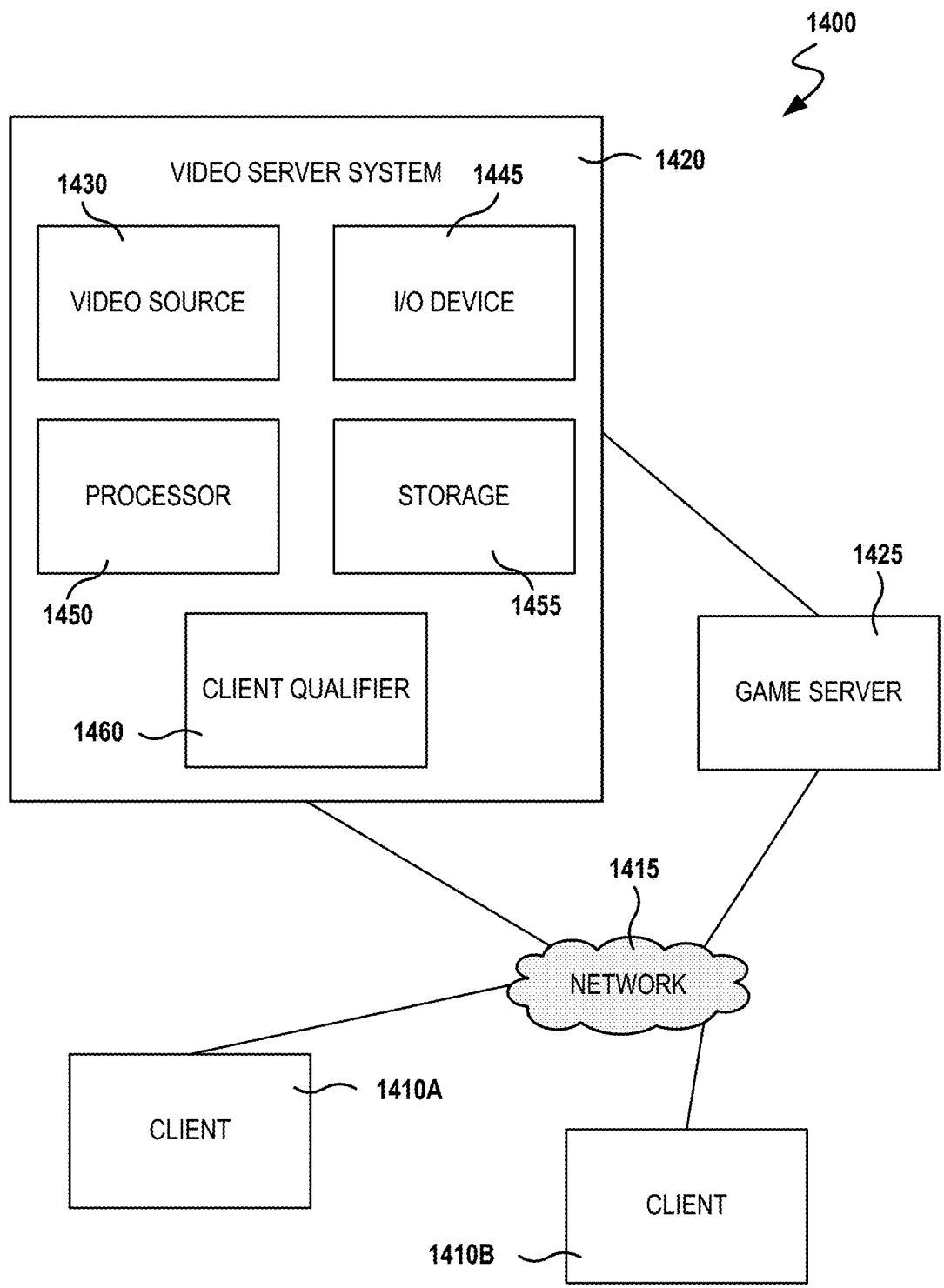
FIG. 14 is a block diagram of a Game System 1400, according to various embodiments of the disclosure.

FIG. 14 is a block diagram of a Game System 1400, according to various embodiments of the disclosure. Game System 1400 is configured to provide a video stream to one or more Clients 1410 via a Network 1415. Game System 1400 typically includes a Video Server System 1420 and an optional game server 1425. Video Server System 1420 is configured to provide the video stream to the one or more Clients 1410 with a minimal quality of service. For example, Video Server System 1420 may receive a game command that changes the state of or a point of view within a video game, and provide Clients 1410 with an updated video stream reflecting this change in state with minimal lag time. The Video Server System 1420 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative embodiments of the disclosure.

Clients 1410, referred to herein individually as 1410A, 1410B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1410 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 1410 or on a separate device such as a monitor or television. Clients 1410 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1410 are optionally geographically dispersed. The number of clients included in Game System 1400 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1420 to deliver a game viewed through the HMD. In one embodiment, the game console receives the video stream from the video server system 1420, and the game console forwards the video stream, or updates to the video stream, to the HMD for rendering.

Clients 1410 are configured to receive video streams via Network 1415. Network 1415 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1410 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1410 may, but are not required to, further include systems configured for modifying received video. For example, a client may be configured to perform further rendering, to overlay one video image on another video image, to crop a video image, and/or the like. For example, Clients 1410 may be configured to receive various types of video frames, such as I-frames, P-frames and B-frames, and to process these frames into images for display to a user. In some embodiments, a member of Clients 1410 is configured to perform further rendering, shading, conversion to 3-D, or like operations on the video stream. A member of Clients 1410 is optionally configured to receive more than one audio or video stream. Input devices of Clients 1410 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1410 is generated and provided by Video Server System 1420. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1410 are typically configured to receive inputs from a user. These inputs may include game commands configured to change the state of the video game or otherwise affect game play. The game commands can be received using input devices and/or may be automatically generated by computing instructions executing on Clients 1410. The received game commands are communicated from Clients 1410 via Network 1415 to Video Server System 1420 and/or Game Server 1425. For example, in some embodiments, the game commands are communicated to Game Server 1425 via Video Server System 1420. In some embodiments, separate copies of the game commands are communicated from Clients 1410 to Game Server 1425 and Video Server System 1420. The communication of game commands is optionally dependent on the identity of the command Game commands are optionally communicated from Client 1410A through a different route or communication channel that that used to provide audio or video streams to Client 1410A.

Game Server 1425 is optionally operated by a different entity than Video Server System 1420. For example, Game Server 1425 may be operated by the publisher of a multi-player game. In this example, Video Server System 1420 is optionally viewed as a client by Game Server 1425 and optionally configured to appear from the point of view of Game Server 1425 to be a prior art client executing a prior art game engine. Communication between Video Server System 1420 and Game Server 1425 optionally occurs via Network 1415. As such, Game Server 1425 can be a prior art multiplayer game server that sends game state information to multiple clients, one of which is game server system 1420. Video Server System 1420 may be configured to communicate with multiple instances of Game Server 1425 at the same time. For example, Video Server System 1420 can be configured to provide a plurality of different video games to different users. Each of these different video games may be supported by a different Game Server 1425 and/or published by different entities. In some embodiments, several geographically distributed instances of Video Server System 1420 are configured to provide game video to a plurality of different users. Each of these instances of Video Server System 1420 may be in communication with the same instance of Game Server 1425. Communication between Video Server System 1420 and one or more Game Server 1425 optionally occurs via a dedicated communication channel. For example, Video Server System 1420 may be connected to Game Server 1425 via a high bandwidth channel that is dedicated to communication between these two systems.

Video Server System 1420 comprises at least a Video Source 1430, an I/O Device 1445, a Processor 1450, and non-transitory Storage 1455. Video Server System 1420 may include one computing device or be distributed among a plurality of computing devices. These computing devices are optionally connected via a communications system such as a local area network.

Video Source 1430 is configured to provide a video stream, e.g., streaming video or a series of video frames that form a moving picture. In some embodiments, Video Source 1430 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1425. Game Server 1425 may maintain a copy of the state of the game based on game commands received from multiple players using geographically disperse clients. In these cases, the game state is provided by Game Server 1425 to Video Source 1430, wherein a copy of the game state is stored and rendering is performed. Game Server 1425 may receive game commands directly from Clients 1410 via Network 1415, and/or may receive game commands via Video Server System 1420.

Video Source 1430 typically includes rendering logic, e.g., hardware, firmware, and/or software stored on a computer readable medium such as Storage 1455. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1410. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and an "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1430 includes a video recording device such as a camera. This camera may be used to generate delayed or live video that can be included in the video stream of a computer game. The resulting video stream optionally includes both rendered images and images recorded using a still or video camera. Video Source 1430 may also include storage devices configured to store previously recorded video to be included in a video stream. Video Source 1430 may also include motion or positioning sensing devices configured to detect motion or position of an object, e.g., person, and logic configured to determine a game state or produce video-based on the detected motion and/or position.

Video Source 1430 is optionally configured to provide overlays configured to be placed on other video. For example, these overlays may include a command interface, log in instructions, messages to a game player, images of other game players, video feeds of other game players (e.g., webcam video). In embodiments of Client 1410A including a touch screen interface or a gaze detection interface, the overlay may include a virtual keyboard, joystick, touch pad, and/or the like. In one example of an overlay a player's voice is overlaid on an audio stream. Video Source 1430 optionally further includes one or more audio sources.

In embodiments wherein Video Server System 1420 is configured to maintain the game state based on input from more than one player, each player may have a different point of view comprising a position and direction of view. Video Source 1430 is optionally configured to provide a separate video stream for each player based on their point of view. Further, Video Source 1430 may be configured to provide a different frame size, frame data size, and/or encoding to each of Client 1410. Video Source 1430 is optionally configured to provide 3-D video.

I/O Device 1445 is configured for Video Server System 1420 to send and/or receive information such as video, commands, requests for information, a game state, gaze information, device motion, device location, user motion, client identities, player identities, game commands, security information, audio, and/or the like. I/O Device 1445 typically includes communication hardware such as a network card or modem. I/O Device 1445 is configured to communicate with Game Server 1425, Network 1415, and/or Clients 1410.

Processor 1450 is configured to execute logic, e.g. software, included within the various components of Video Server System 1420 discussed herein. For example, Processor 1450 may be programmed with software instructions in order to perform the functions of Video Source 1430, Game Server 1425, and/or a Client Qualifier 1460. Video Server System 1420 optionally includes more than one instance of Processor 1450. Processor 1450 may also be programmed with software instructions in order to execute commands received by Video Server System 1420, or to coordinate the operation of the various elements of Game System 1400 discussed herein. Processor 1450 may include one or more hardware device. Processor 1450 is an electronic processor.

Storage 1455 includes non-transitory analog and/or digital storage devices. For example, Storage 1455 may include an analog storage device configured to store video frames. Storage 1455 may include a computer readable digital storage, e.g. a hard drive, an optical drive, or solid state storage. Storage 1415 is configured (e.g. by way of an appropriate data structure or file system) to store video frames, artificial frames, a video stream including both video frames and artificial frames, audio frame, an audio stream, and/or the like. Storage 1455 is optionally distributed among a plurality of devices. In some embodiments, Storage 1455 is configured to store the software components of Video Source 1430 discussed elsewhere herein. These components may be stored in a format ready to be provisioned when needed.

Video Server System 1420 optionally further comprises Client Qualifier 1460. Client Qualifier 1460 is configured for remotely determining the capabilities of a client, such as Clients 1410A or 1410B. These capabilities can include both the capabilities of Client 1410A itself as well as the capabilities of one or more communication channels between Client 1410A and Video Server System 1420. For example, Client Qualifier 1460 may be configured to test a communication channel through Network 1415.

Client Qualifier 1460 can determine (e.g., discover) the capabilities of Client 1410A manually or automatically. Manual determination includes communicating with a user of Client 1410A and asking the user to provide capabilities. For example, in some embodiments, Client Qualifier 1460 is configured to display images, text, and/or the like within a browser of Client 1410A. In one embodiment, Client 1410A is an HMD that includes a browser. In another embodiment, client 1410A is a game console having a browser, which may be displayed on the HMD. The displayed objects request that the user enter information such as operating system, processor, video decoder type, type of network connection, display resolution, etc. of Client 1410A. The information entered by the user is communicated back to Client Qualifier 1460.

Automatic determination may occur, for example, by execution of an agent on Client 1410A and/or by sending test video to Client 1410A. The agent may comprise computing instructions, such as java script, embedded in a web page or installed as an add-on. The agent is optionally provided by Client Qualifier 1460. In various embodiments, the agent can find out processing power of Client 1410A, decoding and display capabilities of Client 1410A, lag time reliability and bandwidth of communication channels between Client 1410A and Video Server System 1420, a display type of Client 1410A, firewalls present on Client 1410A, hardware of Client 1410A, software executing on Client 1410A, registry entries within Client 1410A, and/or the like.

Client Qualifier 1460 includes hardware, firmware, and/or software stored on a computer readable medium. Client Qualifier 1460 is optionally disposed on a computing device separate from one or more other elements of Video Server System 1420. For example, in some embodiments, Client Qualifier 1460 is configured to determine the characteristics of communication channels between Clients 1410 and more than one instance of Video Server System 1420. In these embodiments the information discovered by Client Qualifier can be used to determine which instance of Video Server System 1420 is best suited for delivery of streaming video to one of Clients 1410.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the present disclosure.

What is claimed is:

1. A method, comprising:
    recording gameplay metadata generated from execution of a first session of a video game, the execution of the first session being driven by interactive gameplay of the video game by a first user using a first head-mounted display (HMD), wherein the execution of the first session renders a first view of a virtual environment of the video game for presentation through the first HMD, the first view being from a first location in the virtual environment determined by the interactive gameplay, the first view further being based on tracked movement of the first HMD;
    after completion of the first session, transmitting the gameplay metadata to a client device;
    tracking movement of a second HMD by the client device;
    executing, by the client device, a second session of the video game using the gameplay metadata to recreate gameplay events from the first session in the second session, wherein the execution of the second session renders a second view of the virtual environment for presentation through a second HMD, the second view being from a second location in the virtual environment that is determined based on the first location in the virtual environment, the second view further being based on the tracked movement of the second HMD.

2. The method of claim 1,
    wherein the tracked movement of the first HMD includes a tracked orientation of the first HMD in a first local environment in which the first HMD is disposed;
    wherein an orientation of the first view in the virtual environment is determined by the tracked orientation of the first HMD.

3. The method of claim 2,
    wherein the tracked movement of the second HMD includes a tracked orientation of the second HMD in a second local environment in which the second HMD is disposed;
    wherein an orientation of the second view in the virtual environment is determined by the tracked orientation of the second HMD.

4. The method of claim 1,
    wherein the first location in the virtual environment is a predefined first position in a virtual vehicle that is disposed in the virtual environment;
    wherein the second location in the virtual environment is a predefined second position in the virtual vehicle.

5. The method of claim 4,
    wherein the predefined first position in the virtual vehicle is a driver position in the virtual vehicle;
    wherein the predefined second position in the virtual vehicle is a passenger position in the virtual vehicle.

6. The method of claim 1, wherein the gameplay metadata includes game state values generated by the execution of the first session of the video game.

7. The method of claim 1,
    wherein the execution of the first session includes processing input data generated from the interactive gameplay by the first user;
    wherein the gameplay metadata includes the input data.

8. The method of claim 7, wherein the input data is generated via an input device operated by the first user.

9. The method of claim 1, wherein the first session is executed by a computing device that is remote to the client device, the computing device and the client device being connected to a network, the gameplay metadata being transmitted over the network.

10. A method, comprising:
    recording gameplay metadata generated from execution of a first session of a video game, the execution of the first session being driven by interactive gameplay of the video game by a first user using a first head-mounted display (HMD), wherein the execution of the first session renders a first view of a virtual environment of the video game for presentation through the first HMD, the first view being from a first location in the virtual environment determined by the interactive gameplay, the first view further being based on tracked movement of the first HMD;
    after completion of the first session, transmitting the gameplay metadata to a client device;
    tracking movement of a second HMD by the client device;
    executing, by the client device, a second session of the video game using the gameplay metadata to recreate gameplay events from the first session in the second session, wherein the execution of the second session renders a second view of the virtual environment for presentation through a second HMD, the second view being from a second location in the virtual environment that is determined based on the tracked movement of the second HMD;
    wherein the tracked movement of the second HMD includes a tracked orientation of the second HMD in a local environment in which the second HMD is disposed;
    wherein an orientation of the second view in the virtual environment is determined by the tracked orientation of the second HMD.

11. The method of claim 10, wherein the second location is further determined using input data generated from interactivity with the second session of the video game by a second user.

12. The method of claim 11, wherein the input data is generated via an input device operated by the second user.

13. The method of claim 10, wherein the rendering of the second view is configured to have a setting that is adjusted based on the orientation of the second view relative to the first location of the first view in the virtual environment.

14. The method of claim 13, wherein the adjustment of the setting includes adjustment of a level of detail of the rendering of the second view, such that the level of detail is increased when the orientation of the second view is towards the first location of the first view, and the level of detail is decreased when the orientation of the second view is away from the first location of the first view.

15. The method of claim 14, wherein the level of detail is defined by one or more of an amount of virtual objects, an amount of color saturation, an amount of texture, an amount of shading, a level of resolution, a complexity of graphics.

16. A method, comprising:

recording first metadata generated from execution of a first session of a video game, the execution of the first session being driven by interactive gameplay of the video game by a first user using a first head-mounted display (HMD), wherein the execution of the first session renders a first view of a virtual environment of the video game for presentation through the first HMD, the first view being from a first location in the virtual environment determined by the interactive gameplay, the first view further being based on tracked movement of the first HMD;

after completion of the first session, transmitting the first metadata to a first client device;

tracking movement of a second HMD by the client device;

executing, by the first client device, a second session of the video game using the first metadata to recreate gameplay events from the first session in the second session, wherein the execution of the second session renders a second view of the virtual environment for presentation through a second HMD, the second view being from a second location in the virtual environment, the second view further being based on the tracked movement of the second HMD;

recording second metadata generated from the execution of the second session;

after completion of the second session, transmitting the first metadata and the second metadata to a second client device;

tracking movement of a third HMD by the second client device;

executing, by the second client device, a third session of the video game using the first metadata to recreate gameplay events from the first session in the third session, and using the second metadata to recreate additional interactive events from the second session in the third session, wherein the execution of the third session renders a third view of the virtual environment for presentation through the third HMD, the third view being from a third location in the virtual environment, the third view further being based on the tracked movement of the third HMD.

17. The method of claim 16, wherein recording the second metadata includes recording input generated from interactivity by a second user using the second HMD that triggers the additional interactive events in the second session.

* * * * *